United States Patent [19]

Schmuckal et al.

[11] Patent Number: 5,007,081

[45] Date of Patent: Apr. 9, 1991

[54] SPEECH ACTIVATED TELEPHONE

[75] Inventors: Peter J. Schmuckal, Menlo Park; Mitchell S. Phillips, Sunnyvale; Francis P. Keiper, III, San Jose; James C. Sprout, Los Altos; Ronald H. Fried, Sunnyvale, all of Calif.

[73] Assignee: Origin Technology, Inc., Sunnyvale, Calif.

[21] Appl. No.: 294,168

[22] Filed: Jan. 5, 1989

[51] Int. Cl.$^5$ .......................................... H04M 1/272
[52] U.S. Cl. ................................... 379/354; 379/355; 379/140
[58] Field of Search ................ 379/88, 354, 355, 58, 379/191

[56] References Cited

U.S. PATENT DOCUMENTS

| | | | |
|---|---|---|---|
| 4,509,133 | 4/1985 | Monbaron et al. | 364/513 |
| 4,644,107 | 2/1987 | Clowes et al. | 379/354 |
| 4,709,387 | 11/1987 | Masuda | 379/354 |
| 4,864,622 | 9/1989 | Iida | 381/41 |
| 4,866,778 | 9/1989 | Baker | 381/43 |

OTHER PUBLICATIONS

Model VRD #100, "Dial-Less Phone", Sound & Communications, Nov. 1984 [379-388].
"Voice Dialer", M. Immendorfer, Electrical Communication (ITT), vol. 59, No. 3, publ'd May 6, 1985 (379-355).
"New Generation Phone Dials at the Sound of Your Voice", COMB Product Catalog, Sept. 1986, p. 7, bottom right.
"DIALESS TM I The Ultimate Family Phone", The Scope Catalog, Jan. 1986.

*Primary Examiner*—James L. Dwyer
*Attorney, Agent, or Firm*—Limbach, Limbach & Sutton

[57] ABSTRACT

In the present invention, a speech activated telephone is disclosed. The speech activated phone stores a plurality of spoken words, the telephone number and the alphanumeric word associated with each spoken word. The telephone automatically dials the telephone number in response to inputted spoken word, matching the stored spoken word. In addition, the telephone number and alphanumeric text for the matched spoken word is displayed.

4 Claims, 28 Drawing Sheets

Microfiche Appendix Included
(448 Microfiche, 5 Pages)

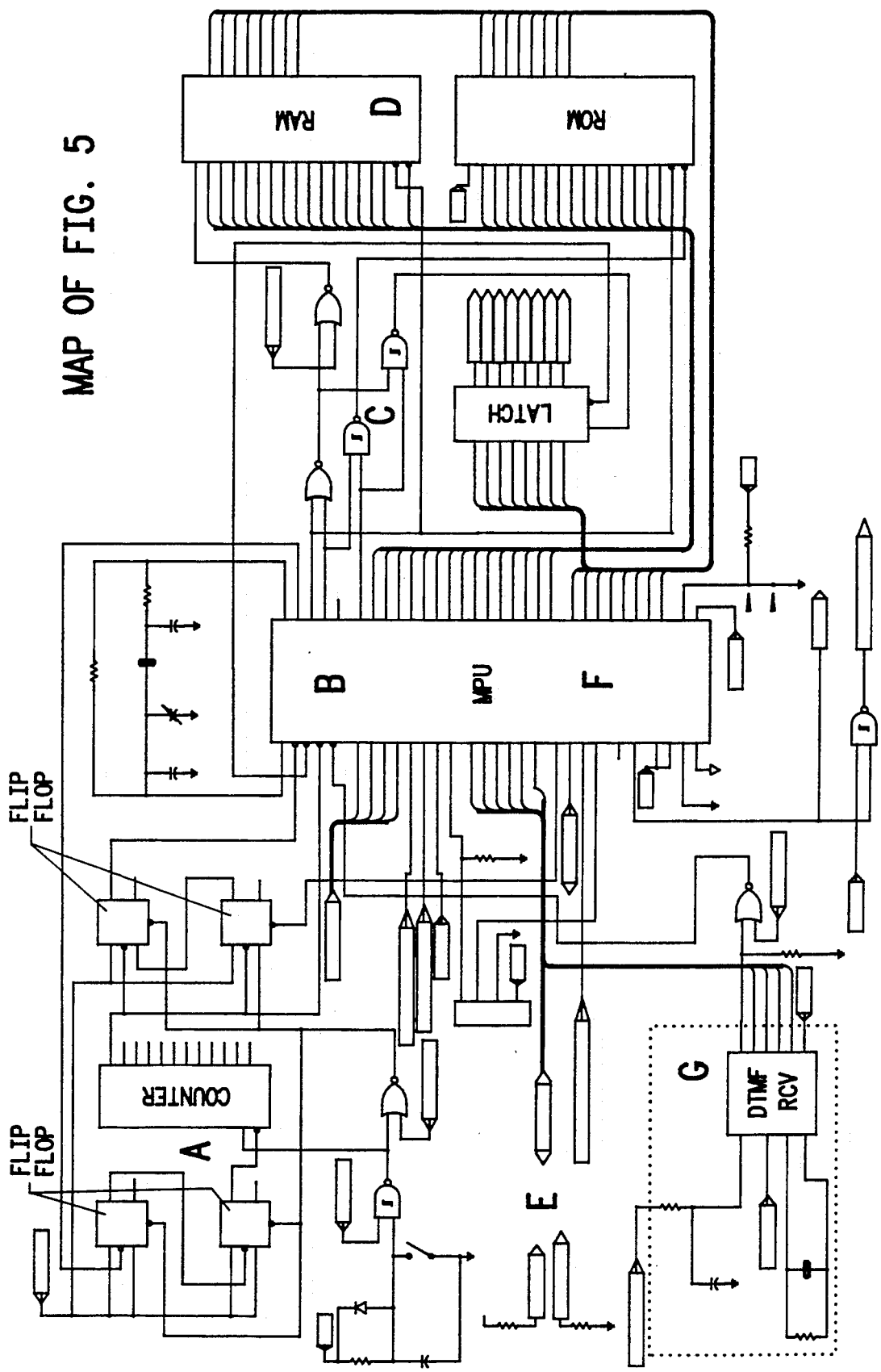

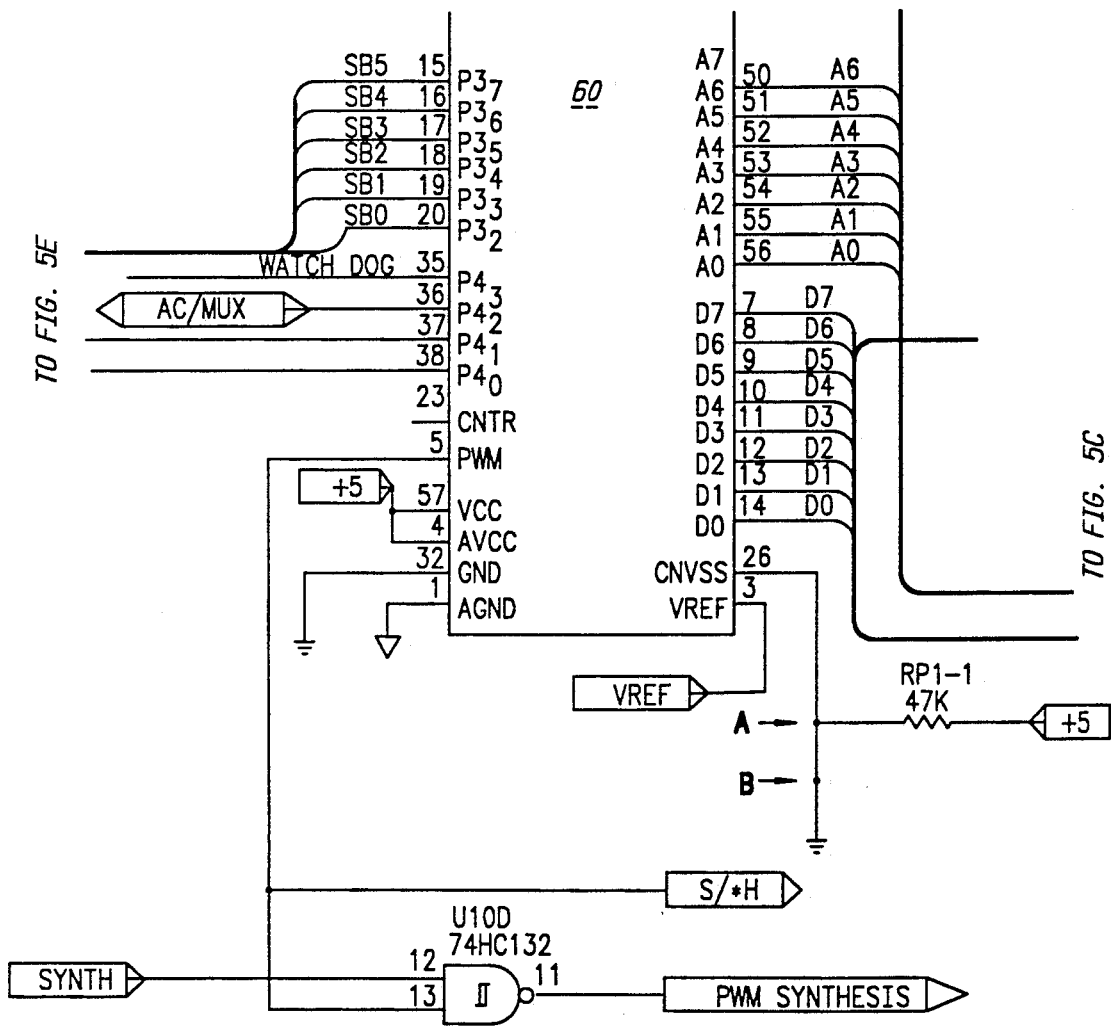

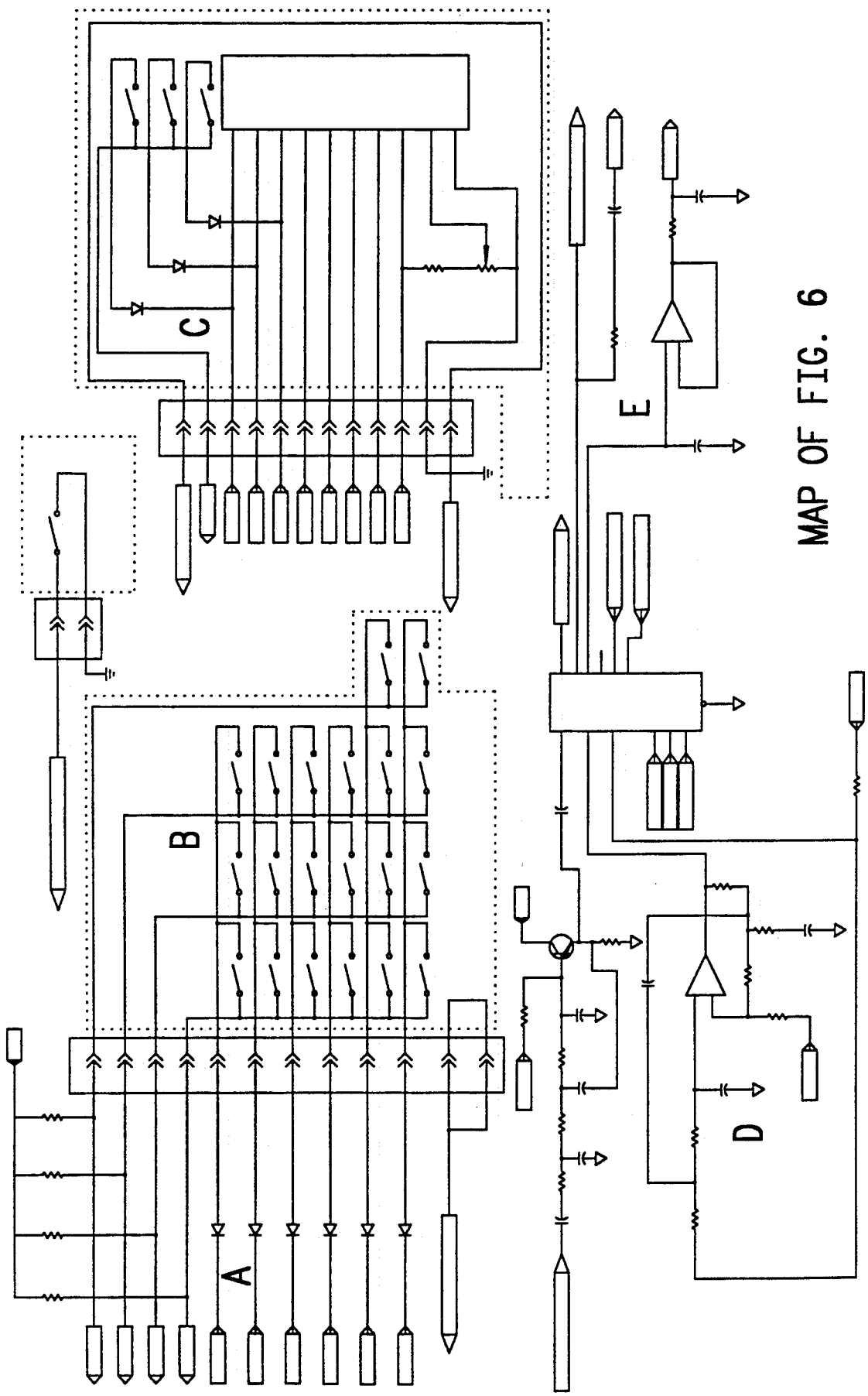
MAP OF FIG. 6

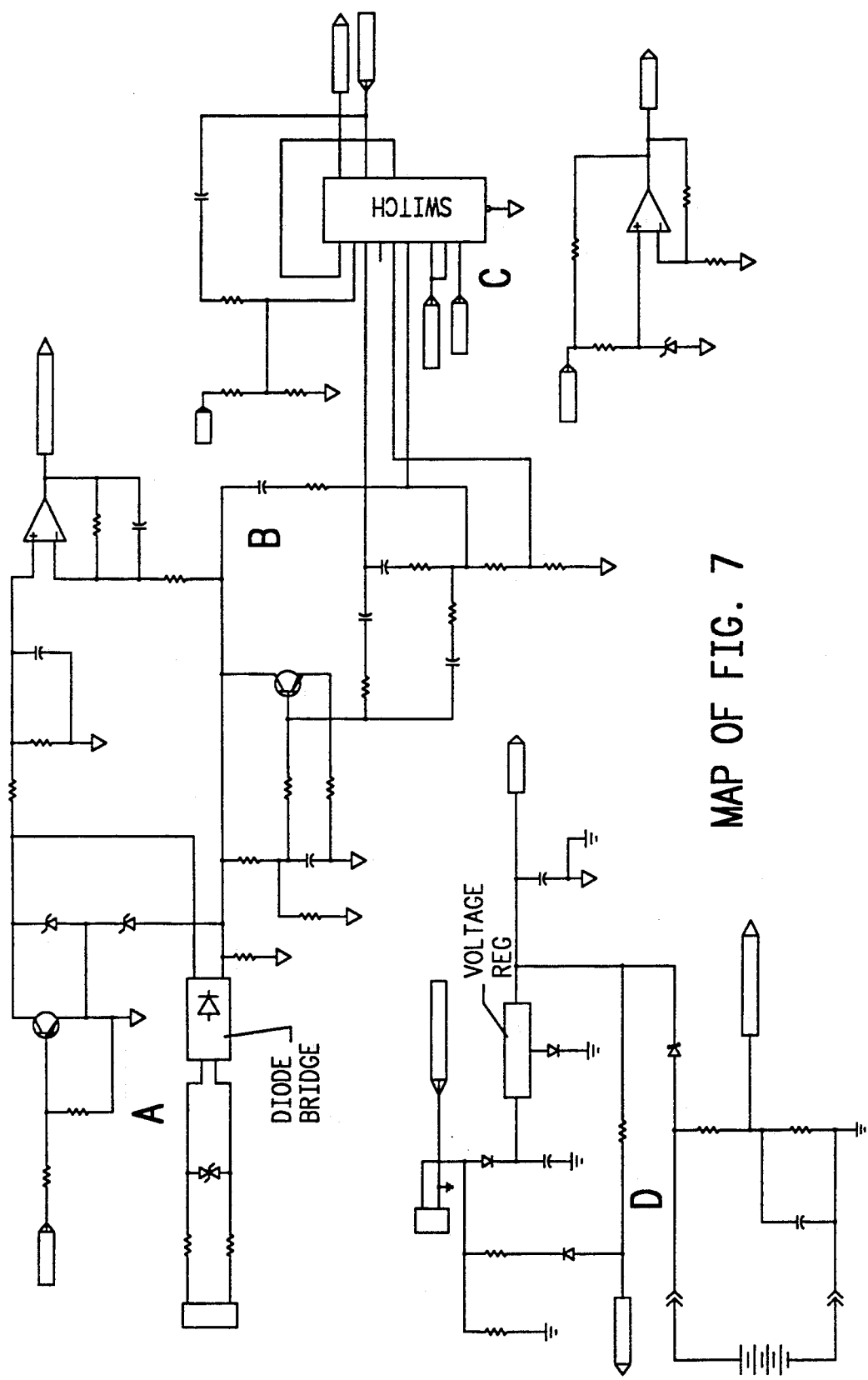

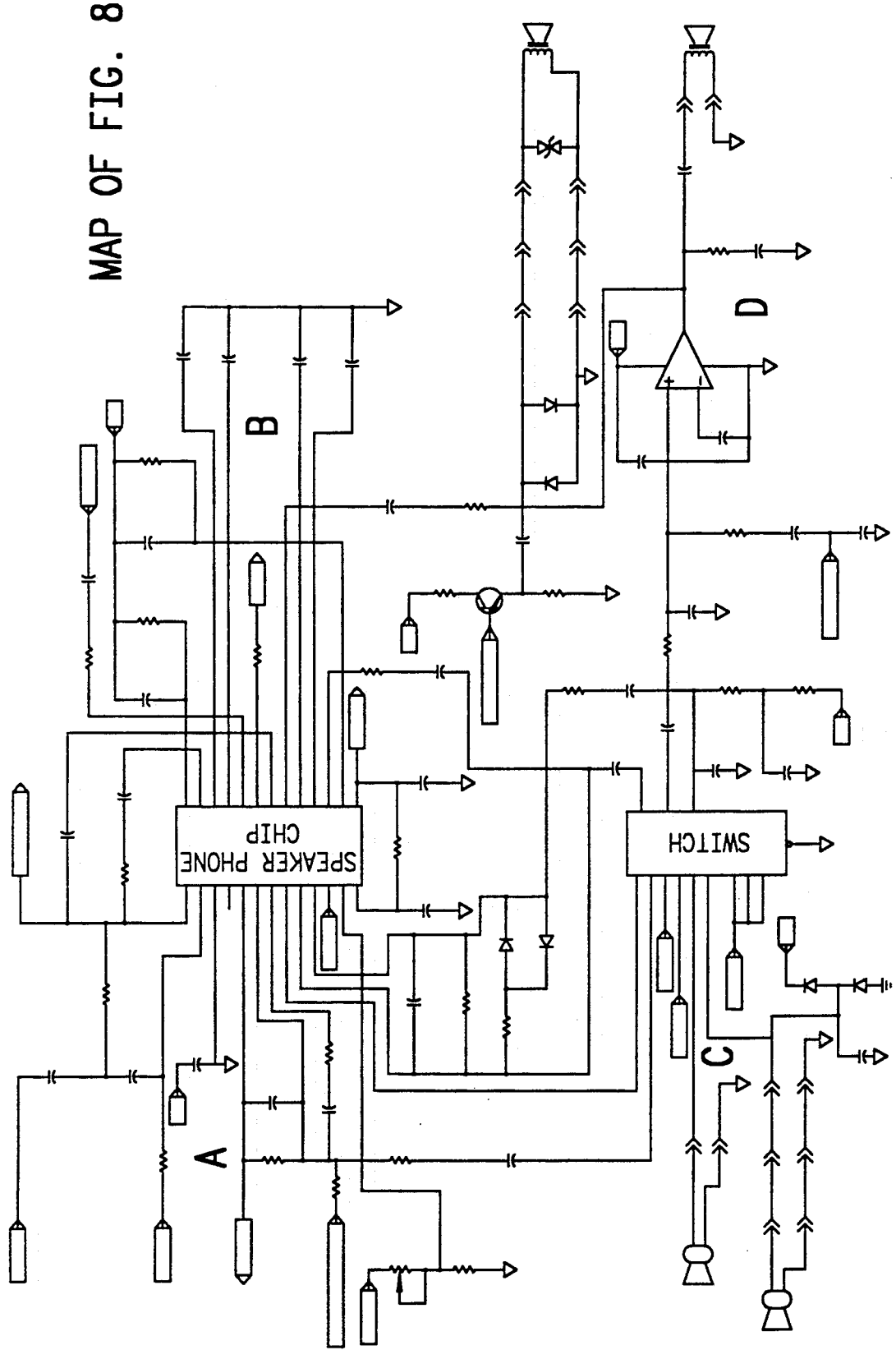
MAP OF FIG. 8

SPEECH ACTIVATED TELEPHONE

This application is submitted with a microfiche appendix, having Exhibits A, B and C, containing copyrighted material, Copyright 1988, Origin Technology, Inc. The Appendix consists of five (5) microfiches with a total of four hundred forty eight (448) frames. The copyright owner has no objection to the facsimile reproduction by any one of the patent document or the patent disclosure, as it appears in the Patent and Trademark Office patent file or records, but otherwise reserves all copyright rights whatsoever in the appendices.

BACKGROUND OF THE INVENTION

Speech recognition apparatuses are well known in the art. A speech recognition apparatus can be used to activate a number of task including a telephone. However, the algorithm used in speech recognition is complex and has required the use of a dedicated signal processor. The use of a dedicated signal processor has increased the cost of the apparatus.

Although a first difference technique has been used in speaker recognition analysis (see "Telephone-Line Speaker Recognition Using Clipped Autocorrelation Analysis", by H. Ney, *Proc. ICASSP*81 (Atlantic, 1981) p. 188-192)), such an analysis has not been done in speech recognition heretofore.

The basic dynamic time warping (DTW) algorithm, used in speech pattern matching process, is well known in the art. It is disclosed in the article "Dynamic Programming Algorithm Optimization for Spoken Word Recognition" by Hiroaki Sakoe and Seibi Chiba, *IEEE Trans. Acoust., Speech, and Signal Process*, Vol. Assp-26, pp. 43-49, February, 1978. However, that algorithm does not provide a satisfactory solution to the window skewing problem.

A modified DTW algorithm is disclosed in "A Modification Over Sakoe and Chiba's Dynamic Time Warping Algorithm for Isolated Word Recognition", by K. Paliwa, A. Agarwal and S. S. Sinha, *IEEE Int'l Conf. On Acoust. Speech and Sig. Proc.*, Vol. ICASSP-2, pp. 1259-61, May 1982. Although this algorithm attempts to solve the problem of window skewing, it is also subject to error.

It is also known in the prior art to "prune" a DTW operation. In a pruning operation, if a search of k words results in an ith word having the lowest value of X, then in the DTW operation on the subsequent words, if during the summation operation the difference of the coefficients at any point in time exceeds the best score, then the DTW operation is terminated. See "Performance Trade-Offs and Search Techniques for Isolated Word Search Recognition", by R. Bisiani, A. Waibel, *IEEE Int'l Conf. On Acoust. Speech and Sig. Proc.*, Vol. ICASSP-1, pp. 570-73, May 1982. However, this technique still requires a considerable amount of computation.

Speech activated phones are also well known in the art. However, they have not provided a mechanism by which questionable choices of the particular speech pattern to a stored speech pattern can be resolved. Thus, they are prone to error and cannot be resolved by user input. These and other considerations have not permitted a speech activated telephone to use an inexpensive general processor wherein other novel features may be implemented, without a great deal of cost.

In the prior art a single line telephone is connected to a single pair of physical wires labeled tip and ring. Since communication must be effected in both directions through the tip and ring lines, a balance transformer has been used to isolate the tip and ring lines from the transmit and receive lines internal within the telephone. Such a balance transformer is expensive and is bulky.

Prior art telephones have provided for the monitoring of the telephone line to which it is attached. However, the typical monitoring functions have been limited to ringing, hold, and busy. The telephone apparatus has not been able to display the status of whether or not the telephone is connected at all to the line without placing the telephone off hook to determine if the telephone is connected to the line.

SUMMARY OF THE INVENTION

In the present invention a speech activated telephone is disclosed. The telephone uses a modified clipped auto correlation function to process speech signals to produce speech patterns and to store the speech patterns. The telephone also uses a constant width band dynamic time warping processing algorithm and adaptive linear prune line algorithm to match the input speech pattern with the stored speech pattern. Further, the telephone provides for user input on questionable matches.

In addition, in the present invention the telephone has a user interface menu for entering text in conjunction with numeric data and can record and display previously made calls. The telephone also has an answering capability which can screen incoming calls and can forward a particular call and display the associated name, if any of the caller from its directory. Finally, a novel speed dialing feature is also disclosed.

The telephone also has a novel line status monitoring circuit with a novel phone network interface circuit.

DETAILED DESCRIPTION OF THE DRAWINGS

Figure 1:
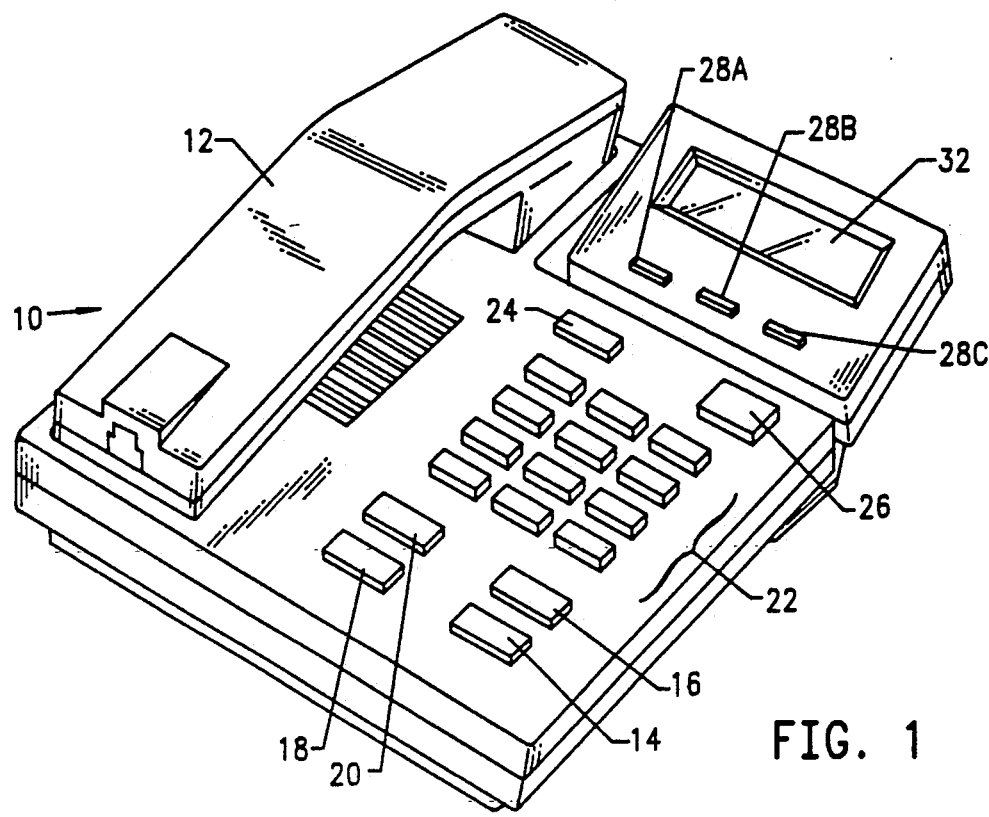
FIG. 1 is a perspective view of a novel telephone device.
Figure 2:
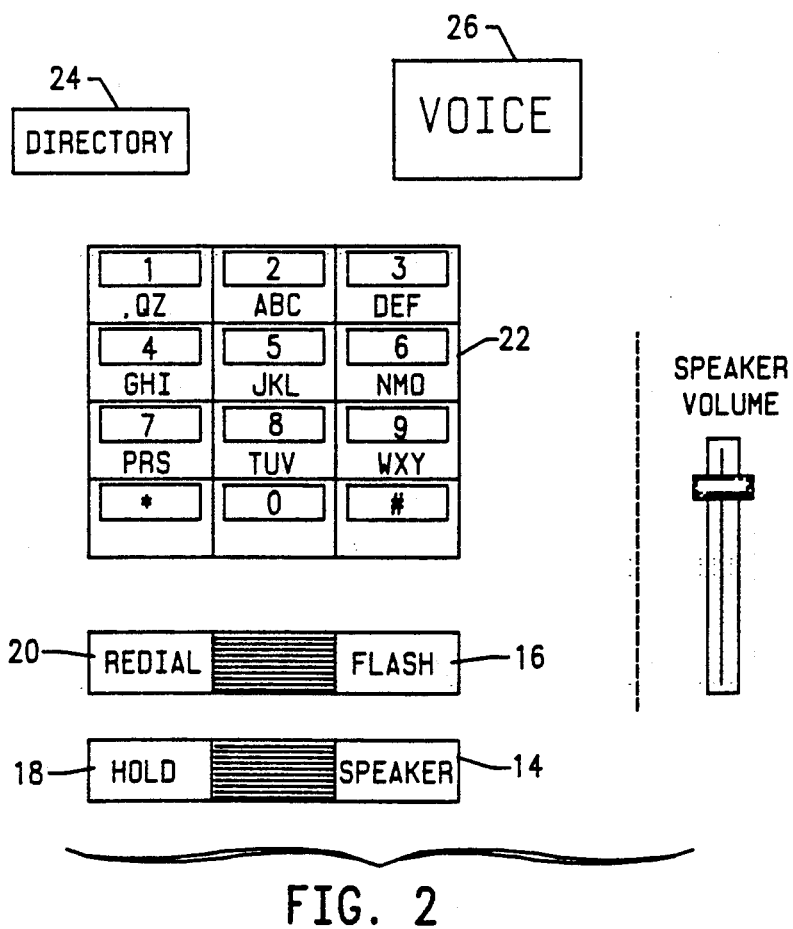
FIG. 2 is a top view of the keyboard layout of the portion of the telephone shown in FIG. 1.

Referring to FIG. 1 there is shown in perspective view a telephone device 10. The telephone 10 comprises a hand set 12 which has a microphone and speaker. The telephone 10 also has a numeric keypad 22 which receives the numeric input numbers (0-9) as well as the control signals of "*" and "#". Such a keyboard is well known in the art. Finally, the telephone 10 comprises a plurality of well known conventional control keys for redial 20, hold 18, flash 16, and speaker 14, to activate the speaker phone.

In addition to the foregoing keys, the telephone 10 also comprises a key labeled directory 24, a key labeled voice 26, and three reprogrammable option buttons 28 (A-C). In addition, the telephone 10 comprises a LCD display 30 which can display two line of alphanumeric characters each line with sixteen characters.

Figure 3:
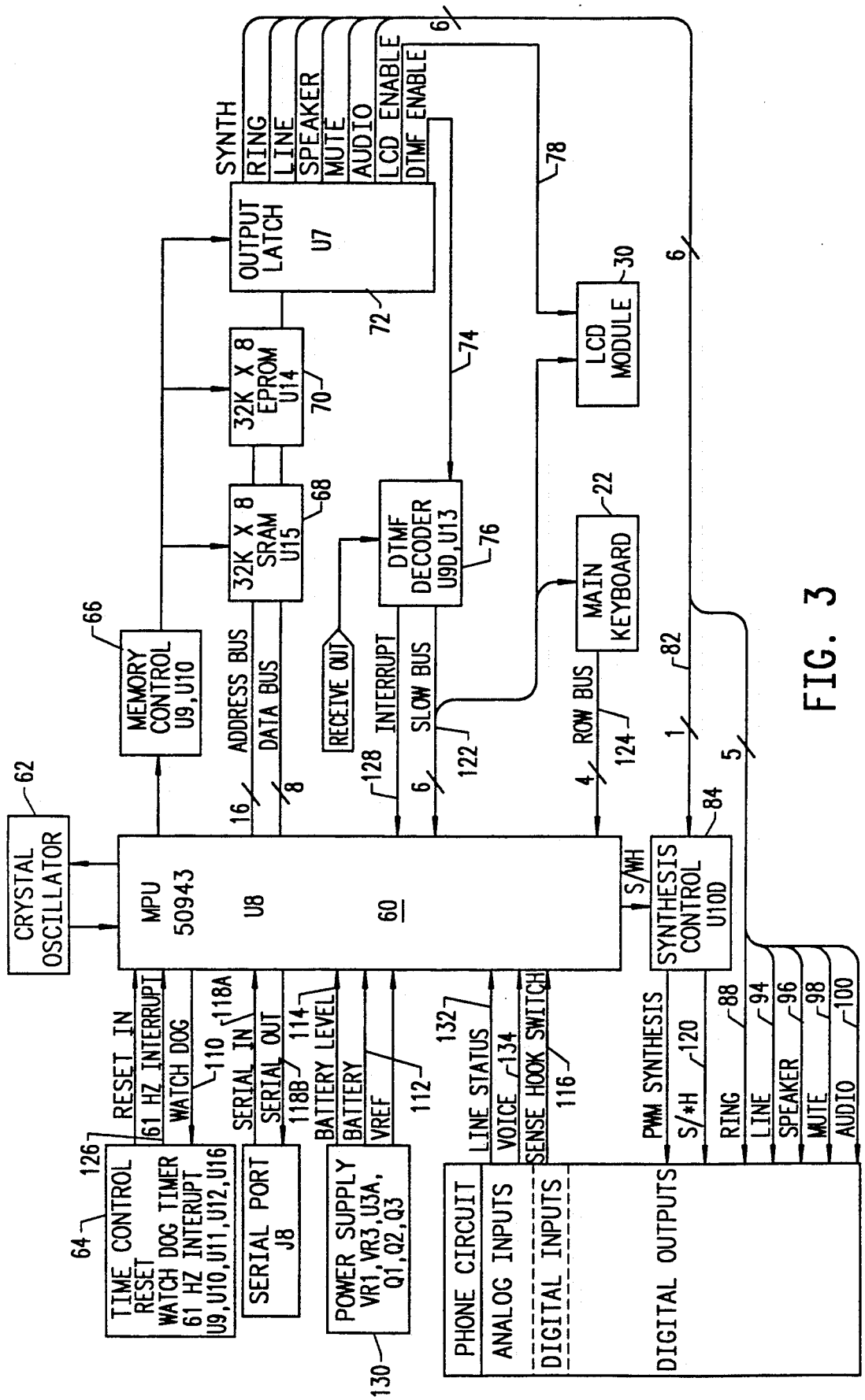
FIG. 3 is a schematic circuit block diagram of the telephone shown in FIG. 1.
Figure 4:
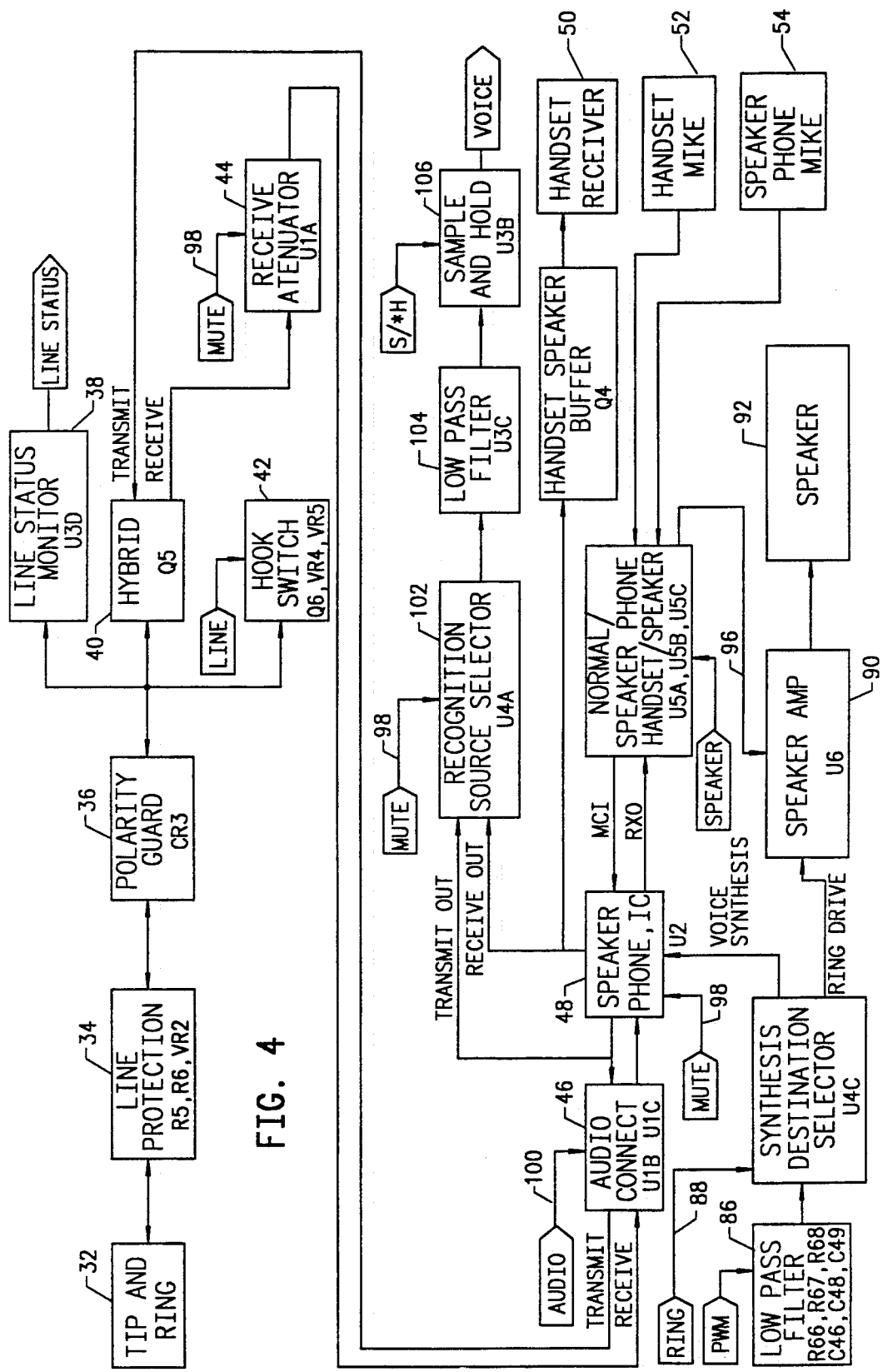
FIG. 4 is a detailed block level schematic diagram of a portion of the circuit shown in FIG. 3.
Figure 5A:
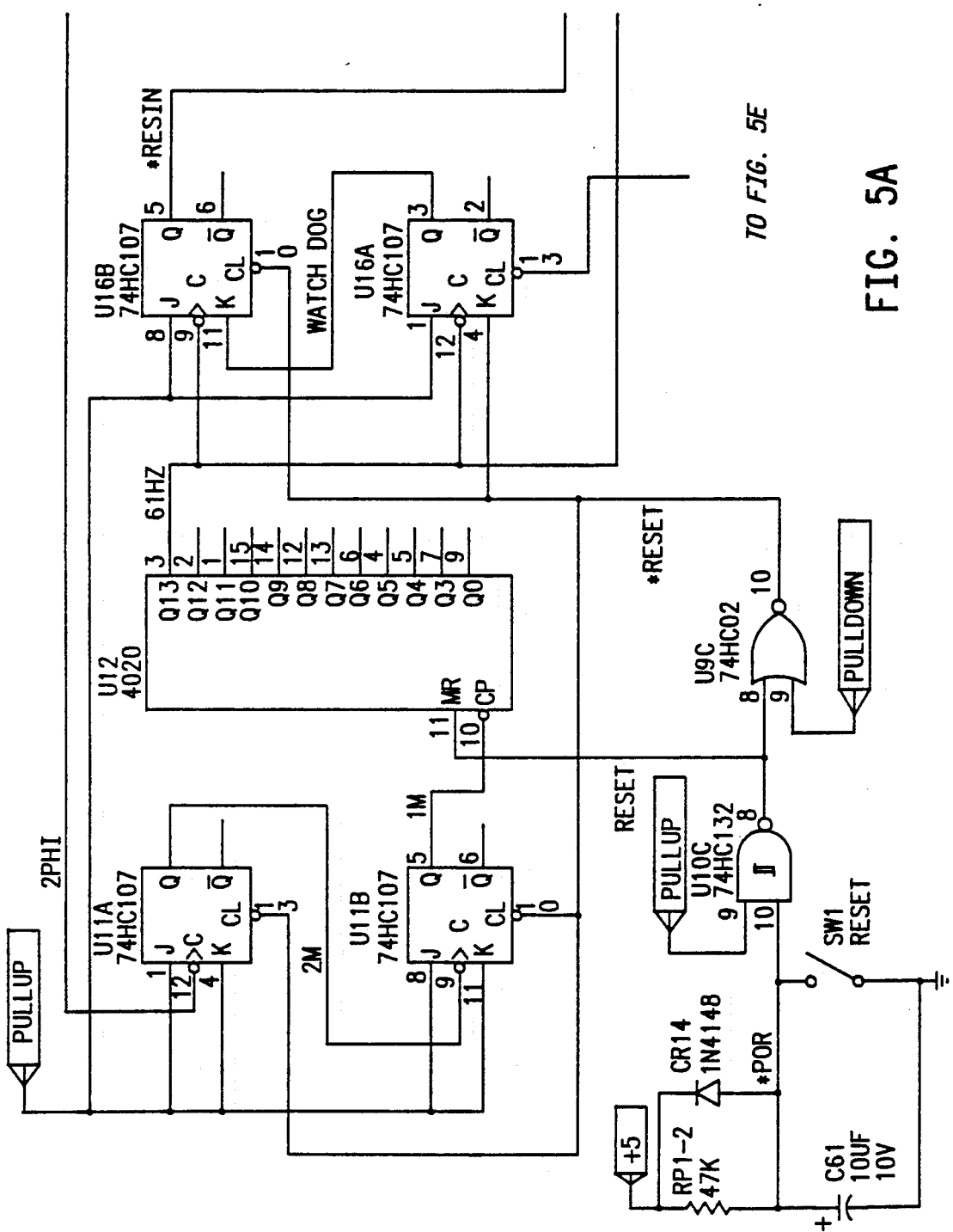
FIG. 5 is a detailed circuit level diagram of the microprocessor and its associated circuitry used in the telephone shown in FIG. 3.
Figure 5B:
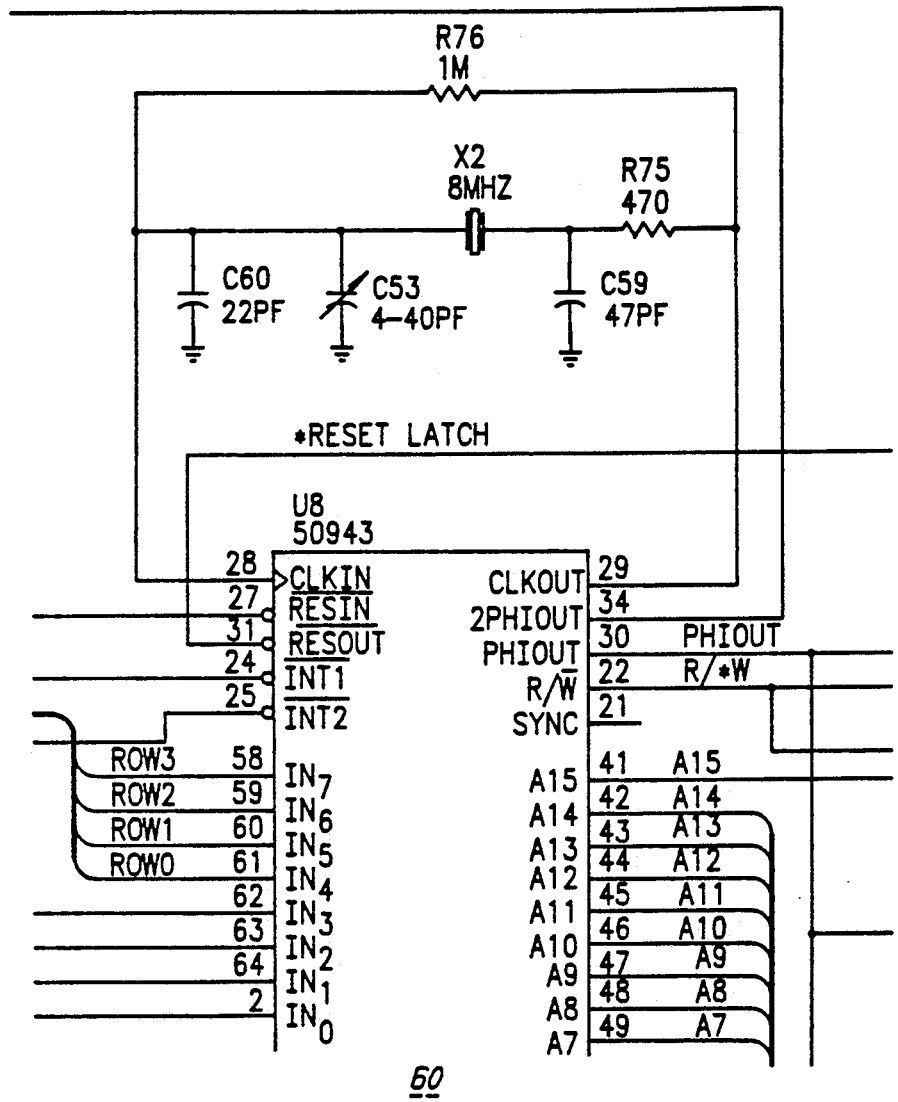
Figure 5C:
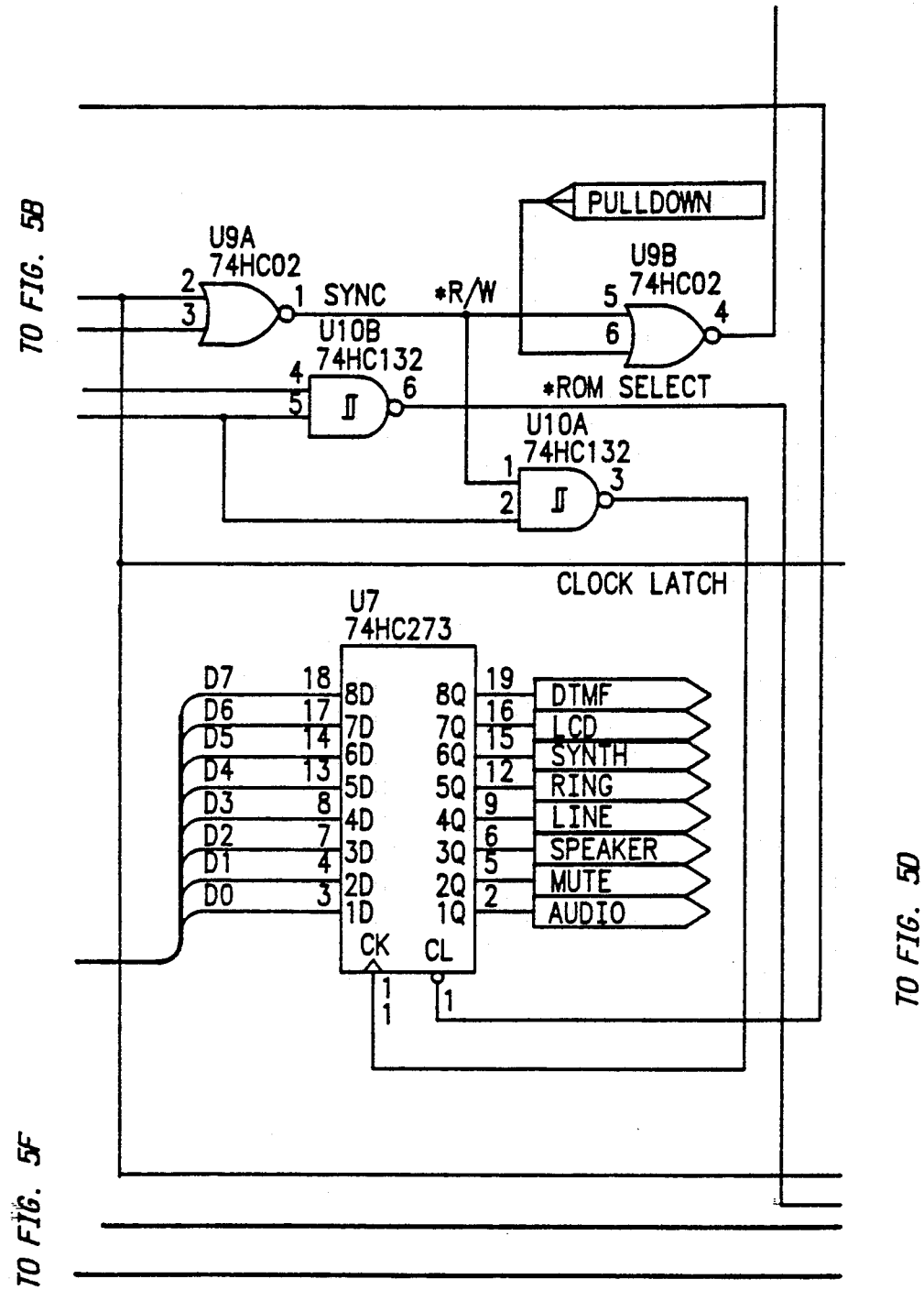
Figure 5D:
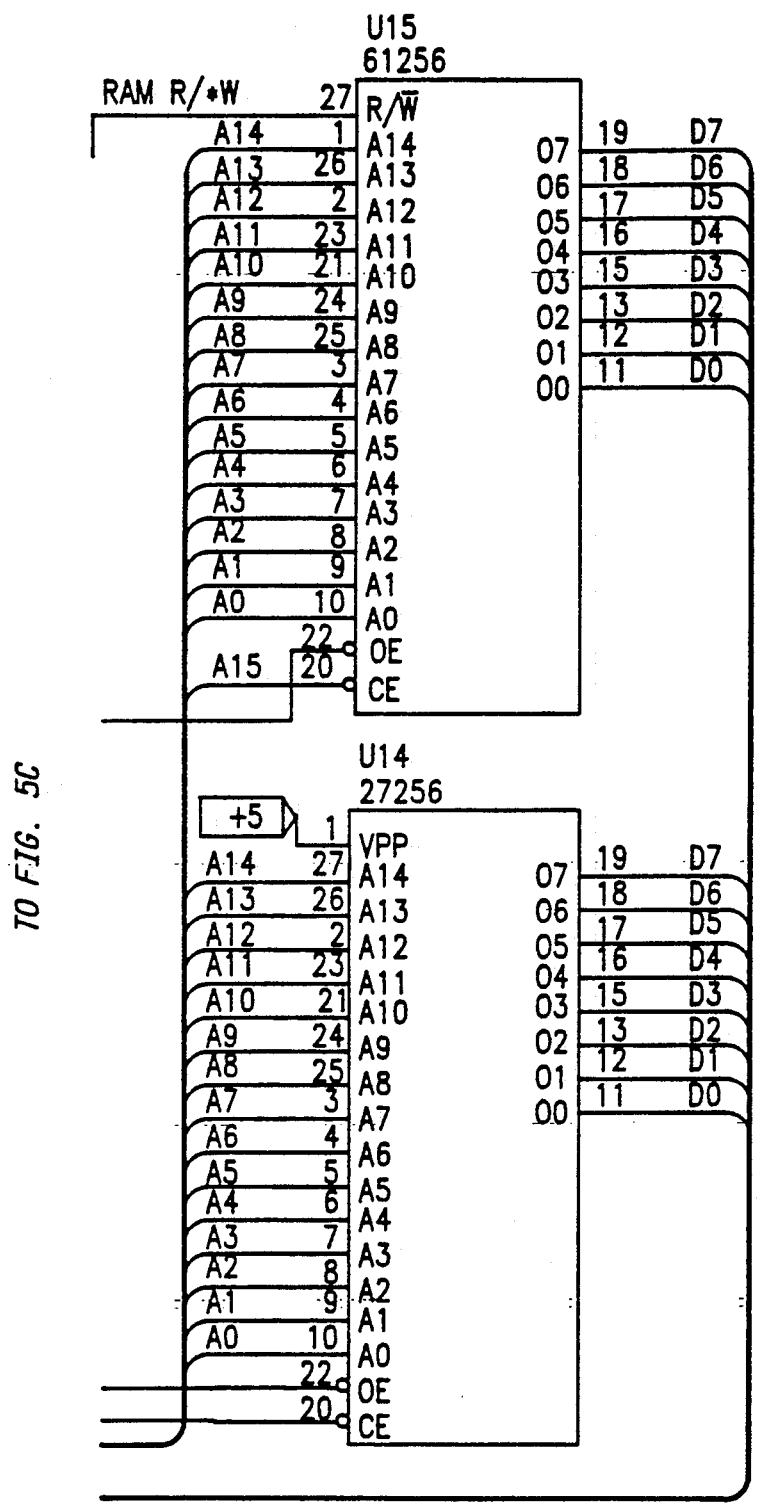
Figure 5E:
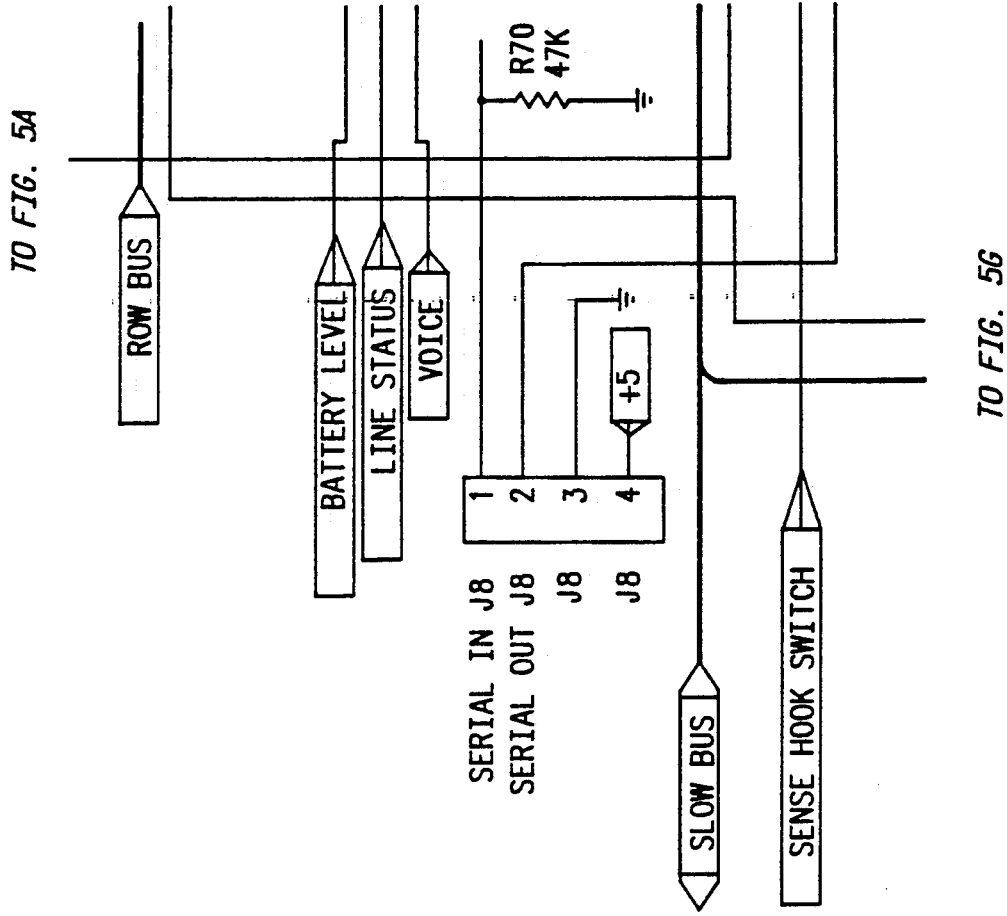
Figure 5E:
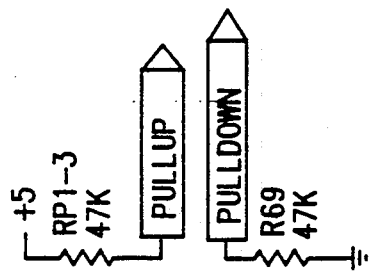
Figure 5G:
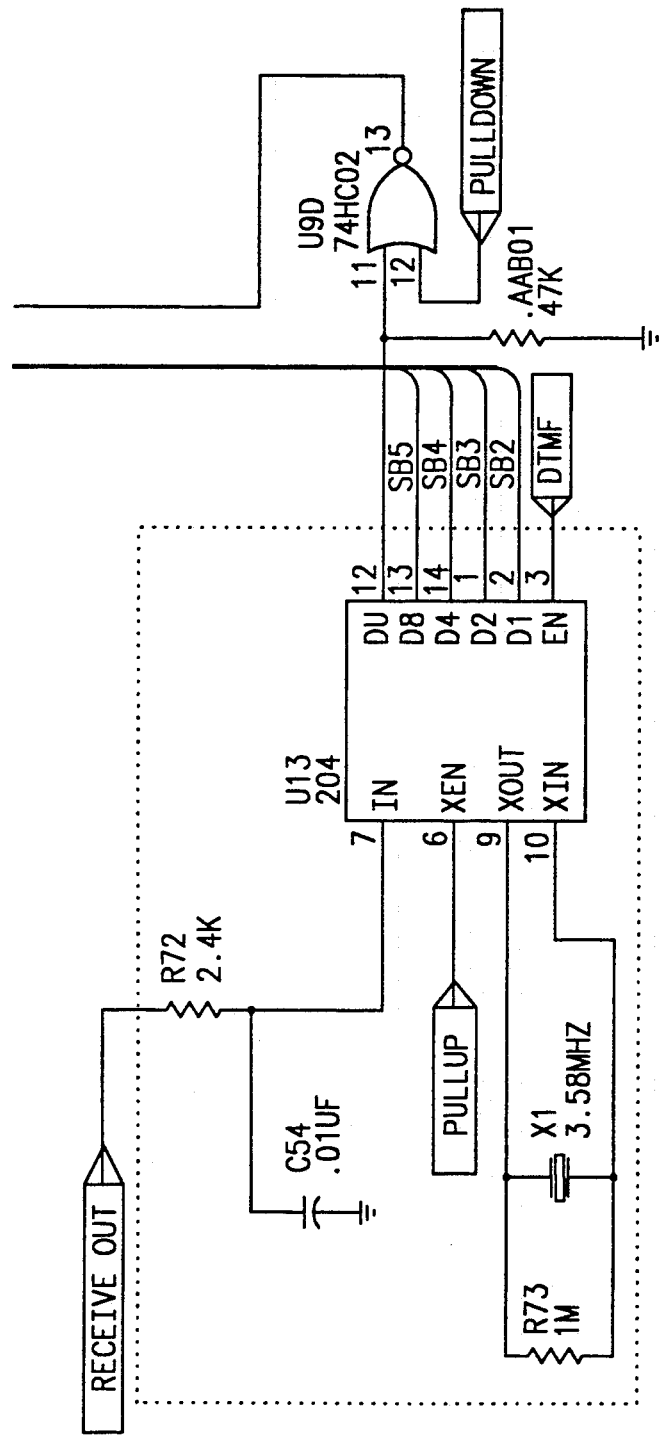
Figure 6A:
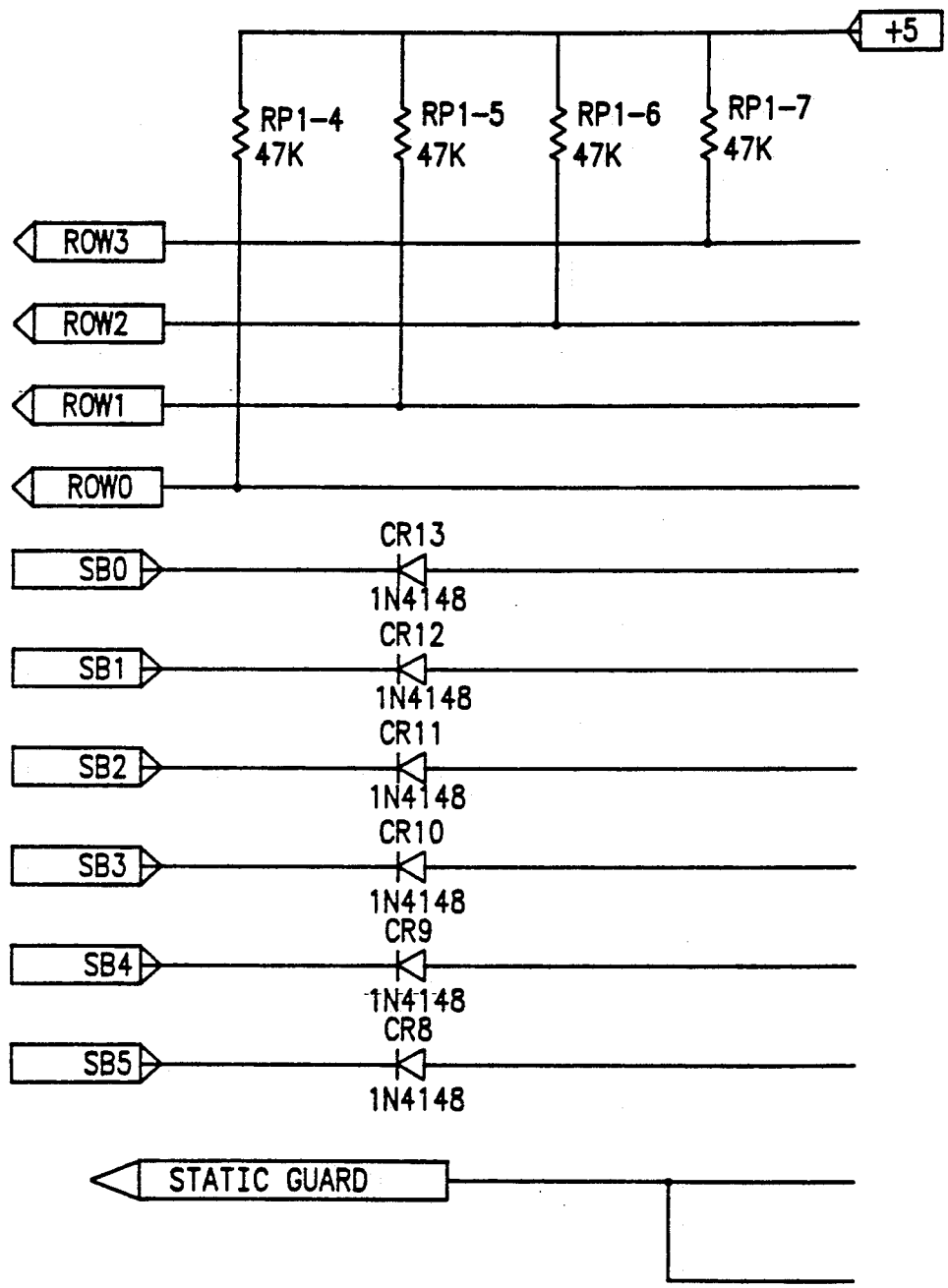
FIG. 6 is a detailed schematic circuit diagram of the keyboard and display assemblies shown in FIG. 3.
Figure 6B:
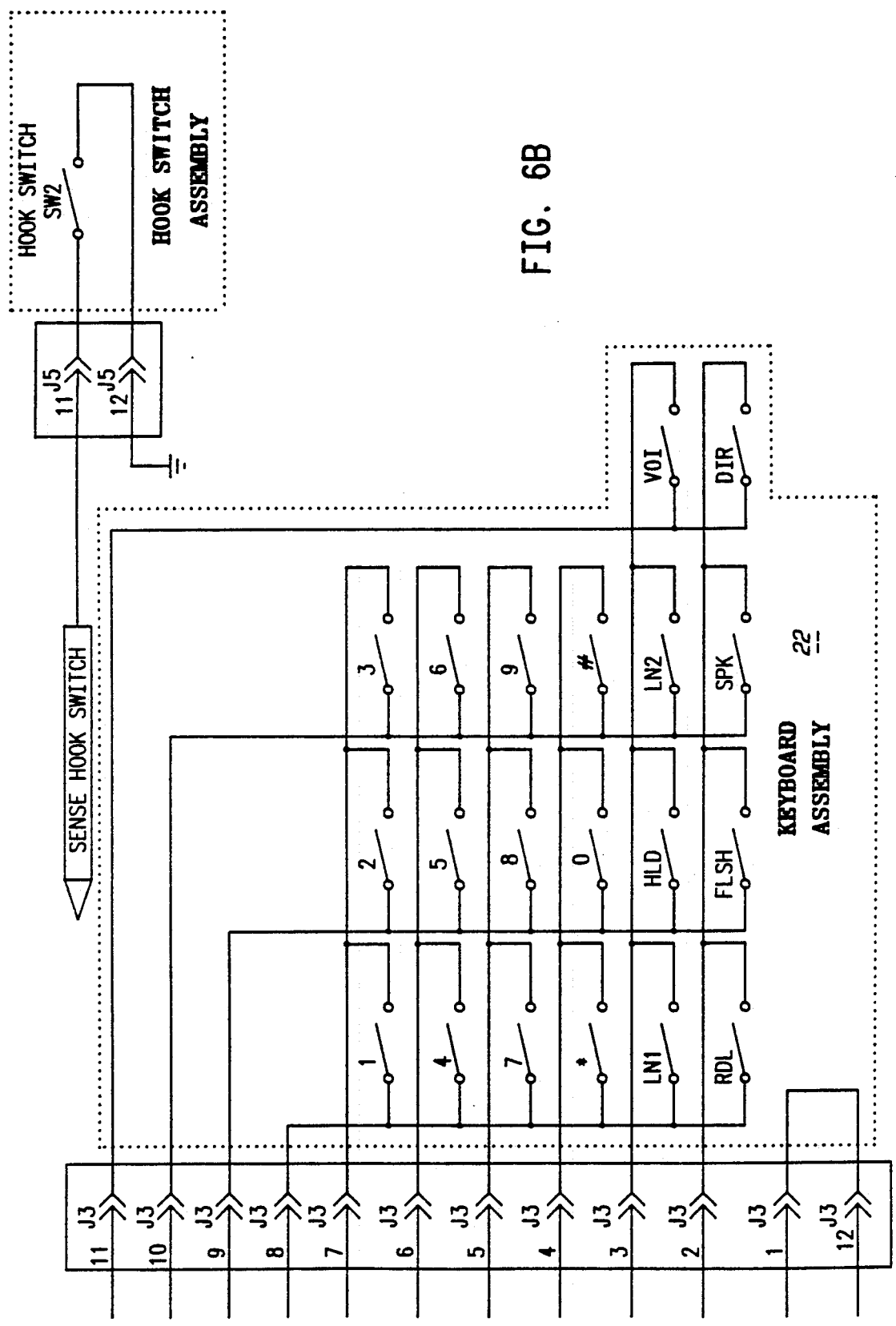
Figure 6C:
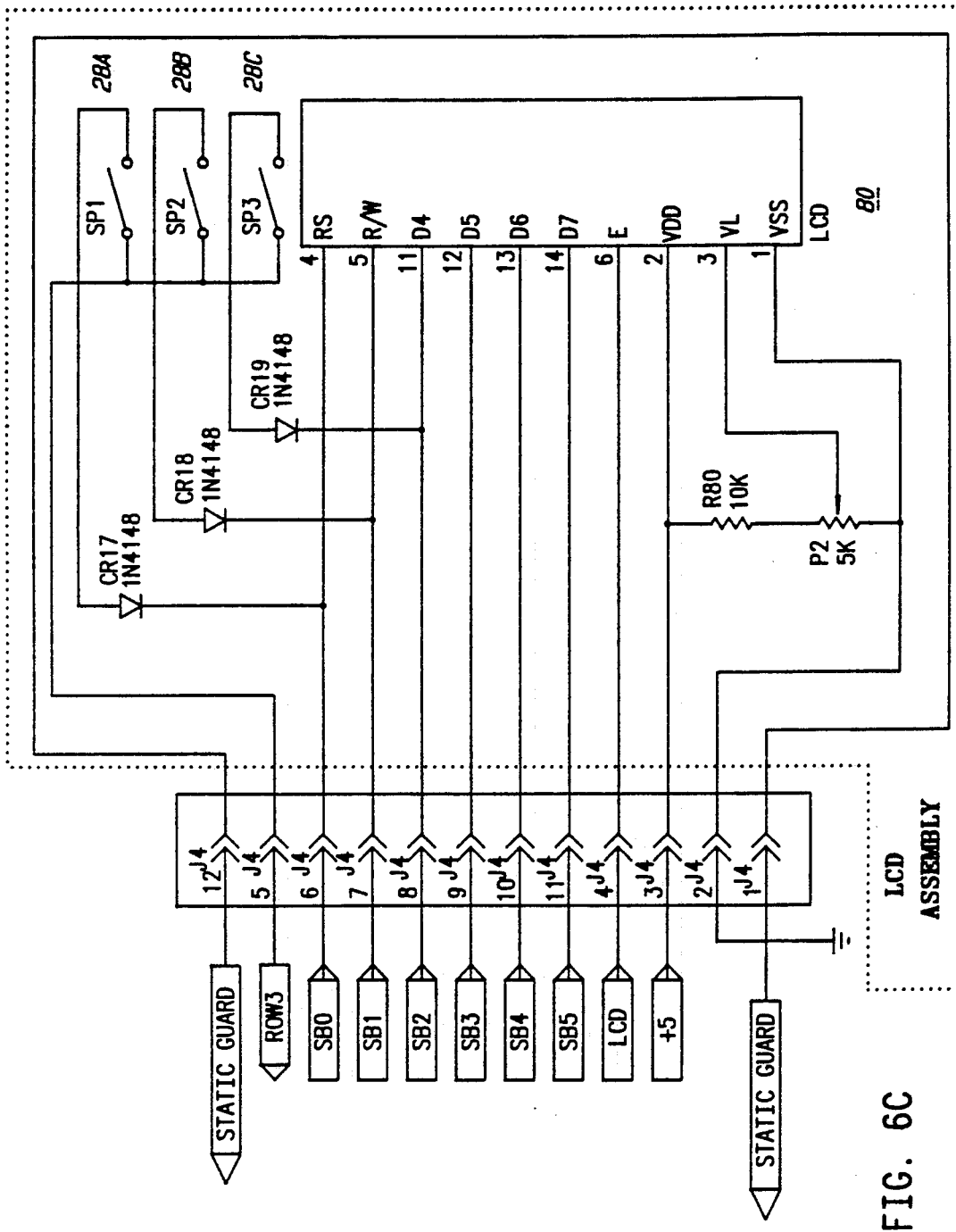
Figure 6D:
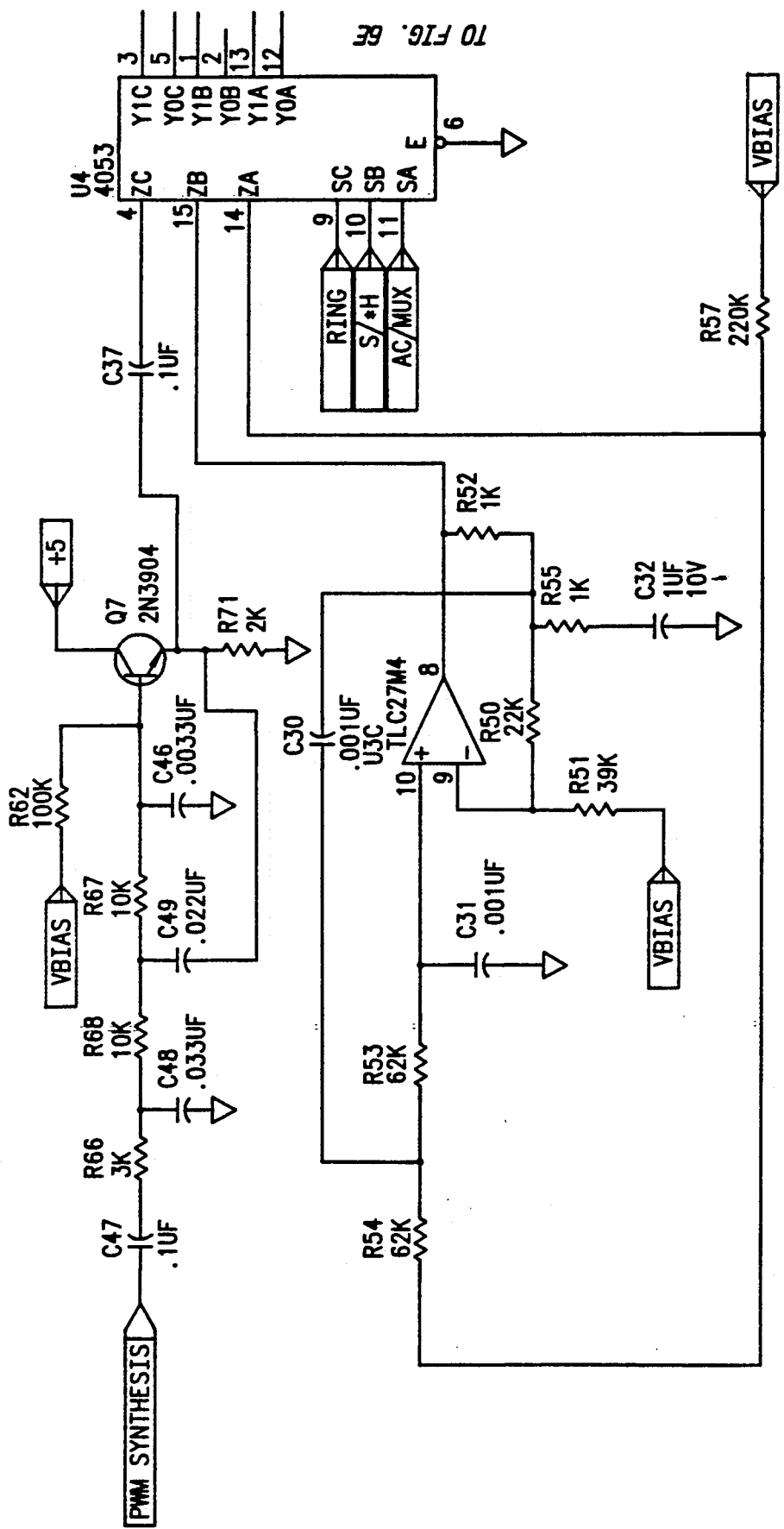
Figure 6E:
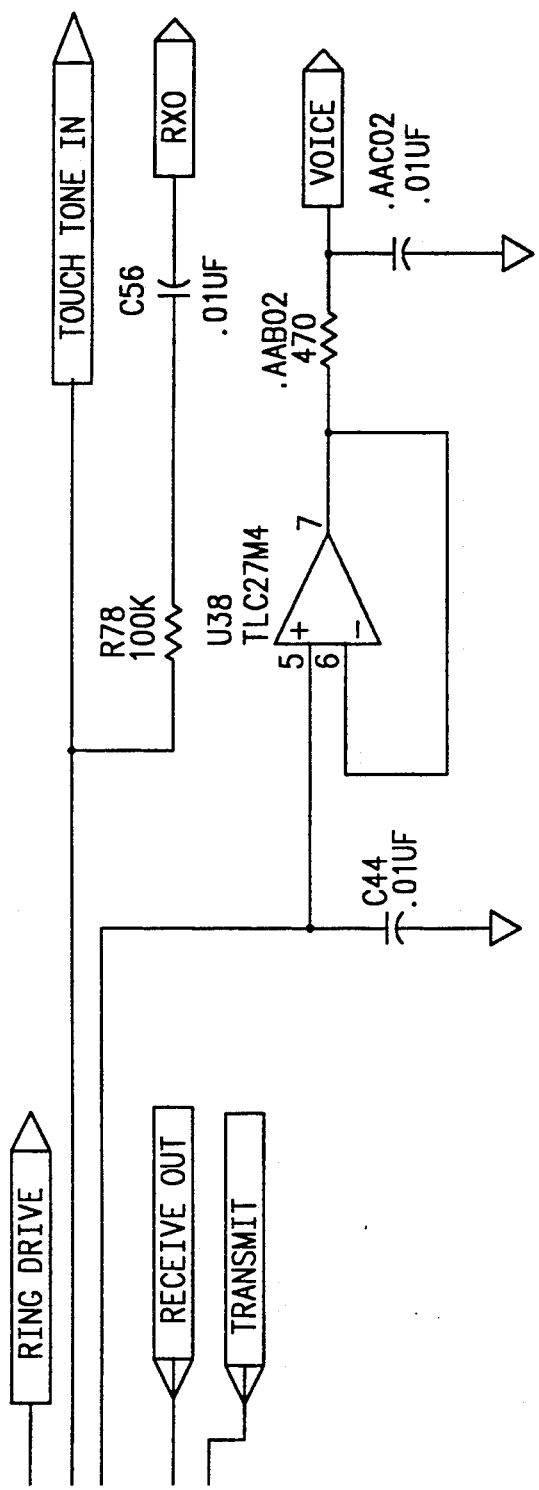
Figure 7A:
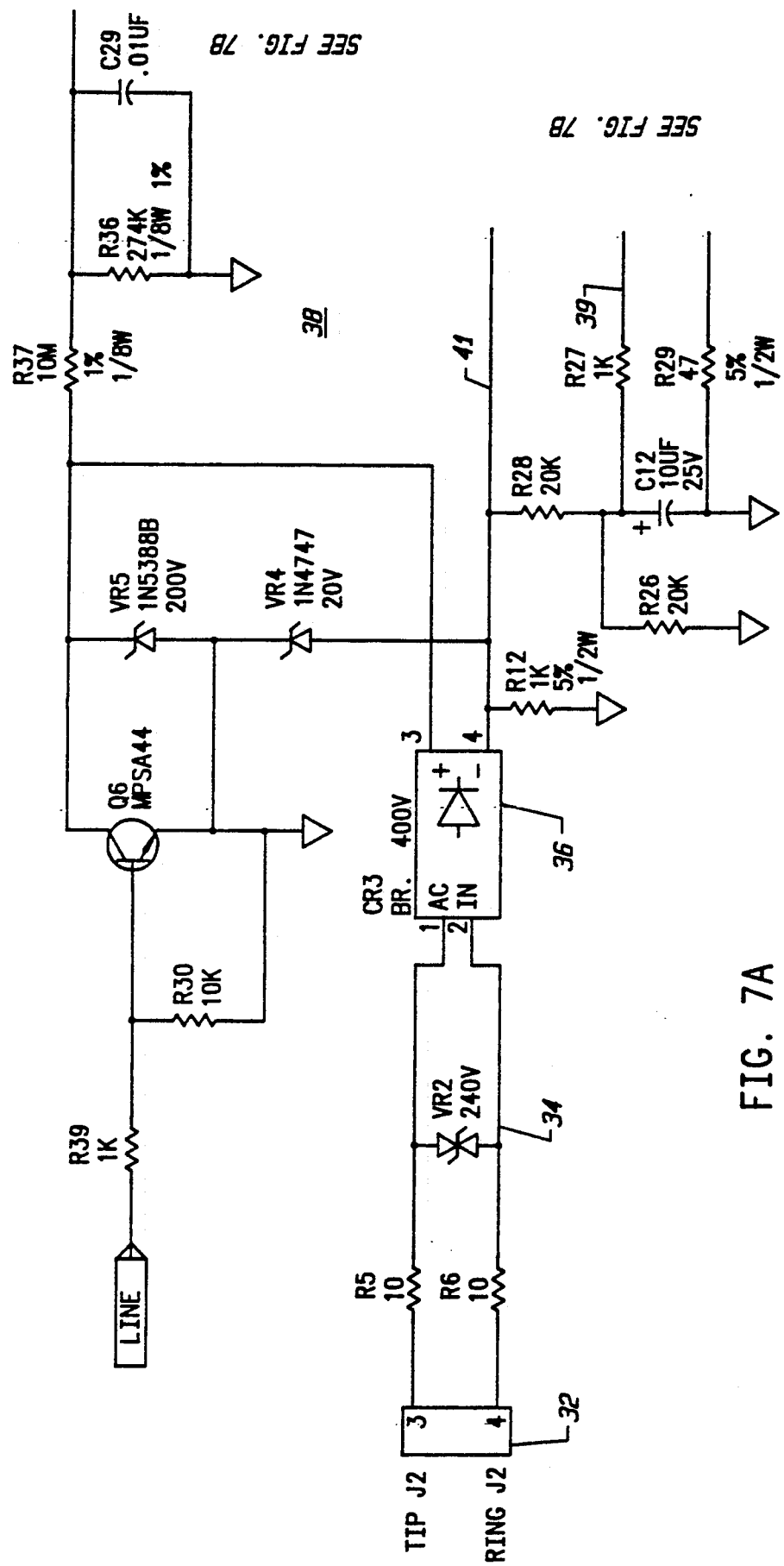
FIG. 7 is a detailed schematic circuit diagram of the telephone network interface circuit portion of the telephone.
Figure 7B:
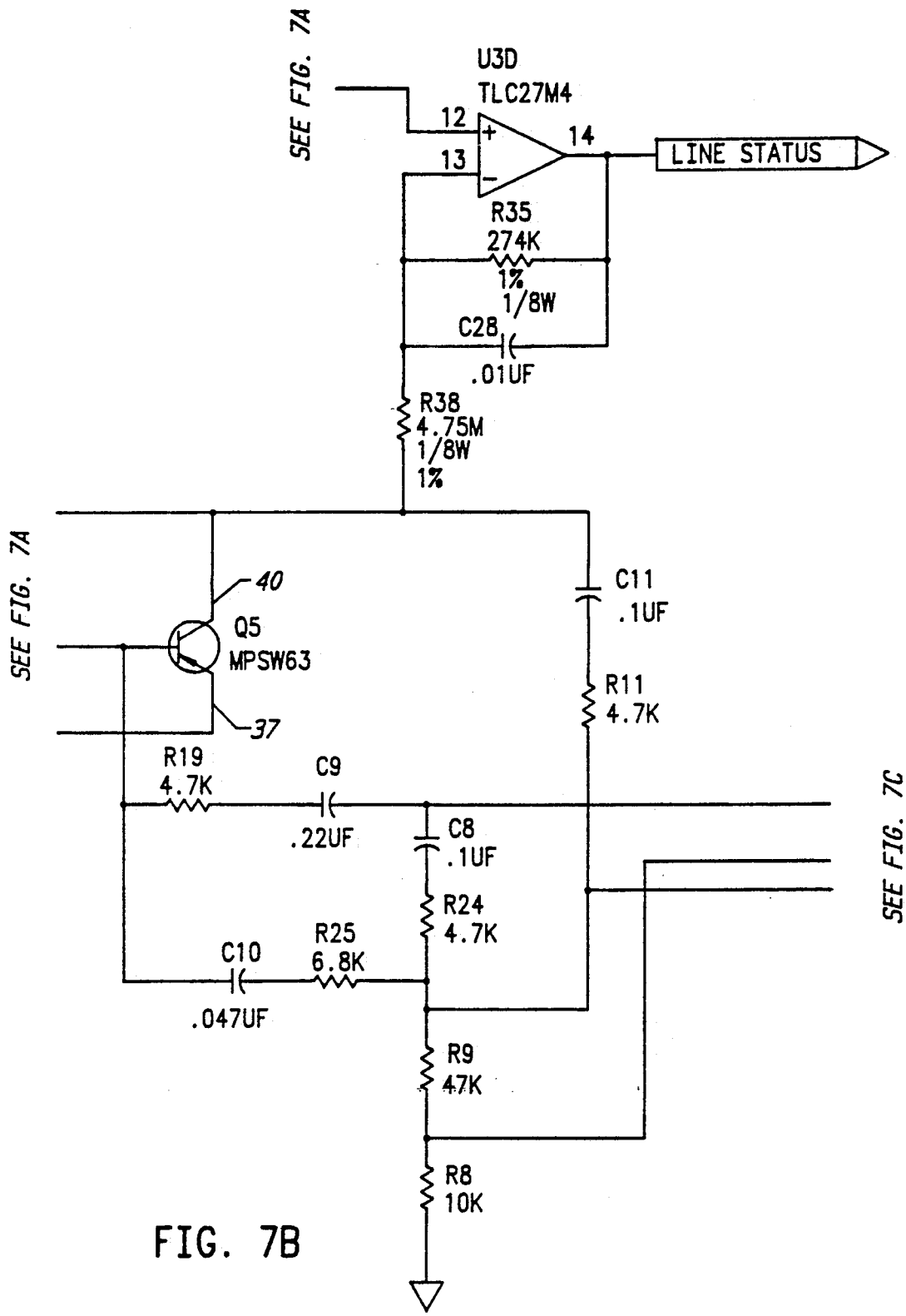
Figure 7C:
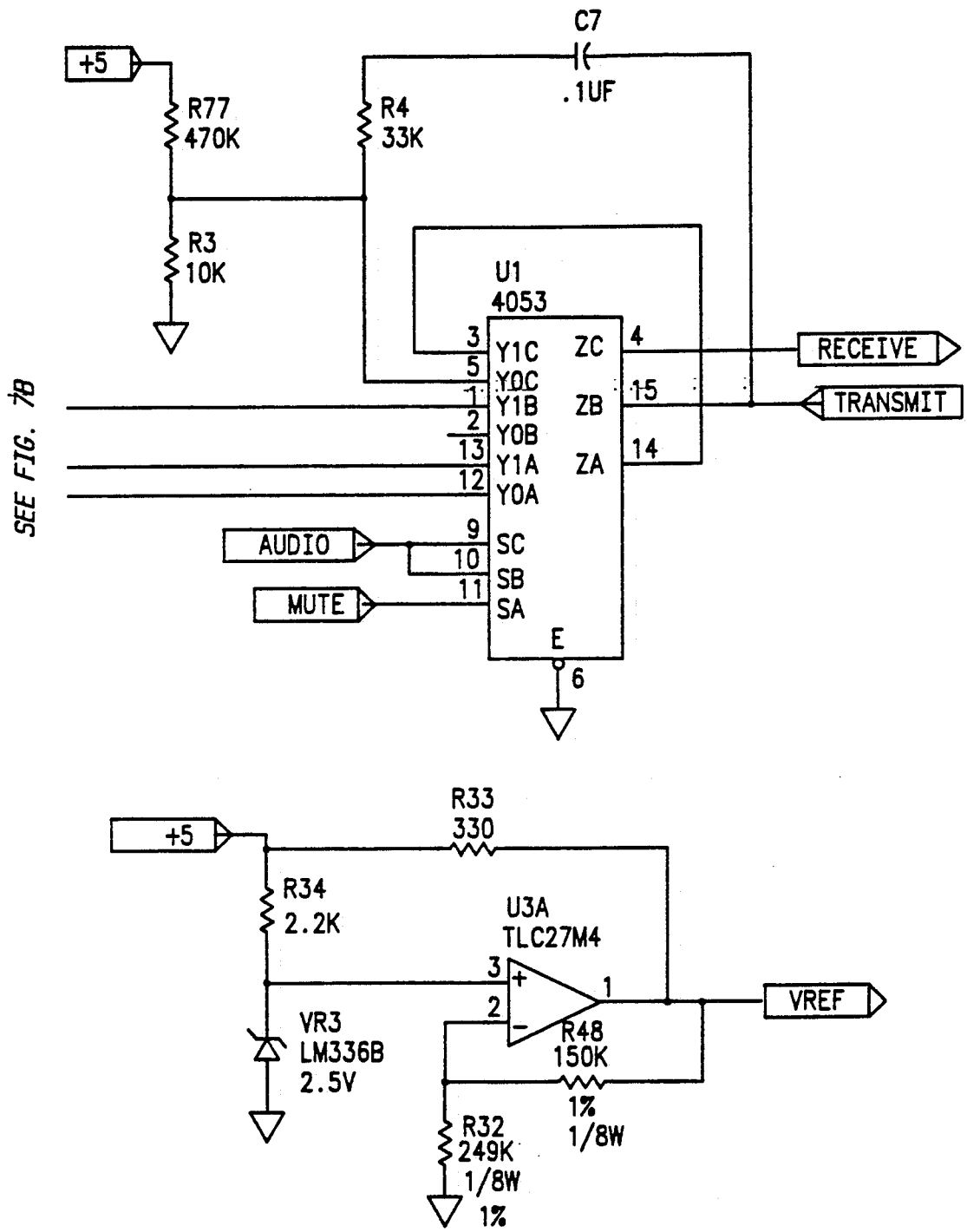
Figure 7D:
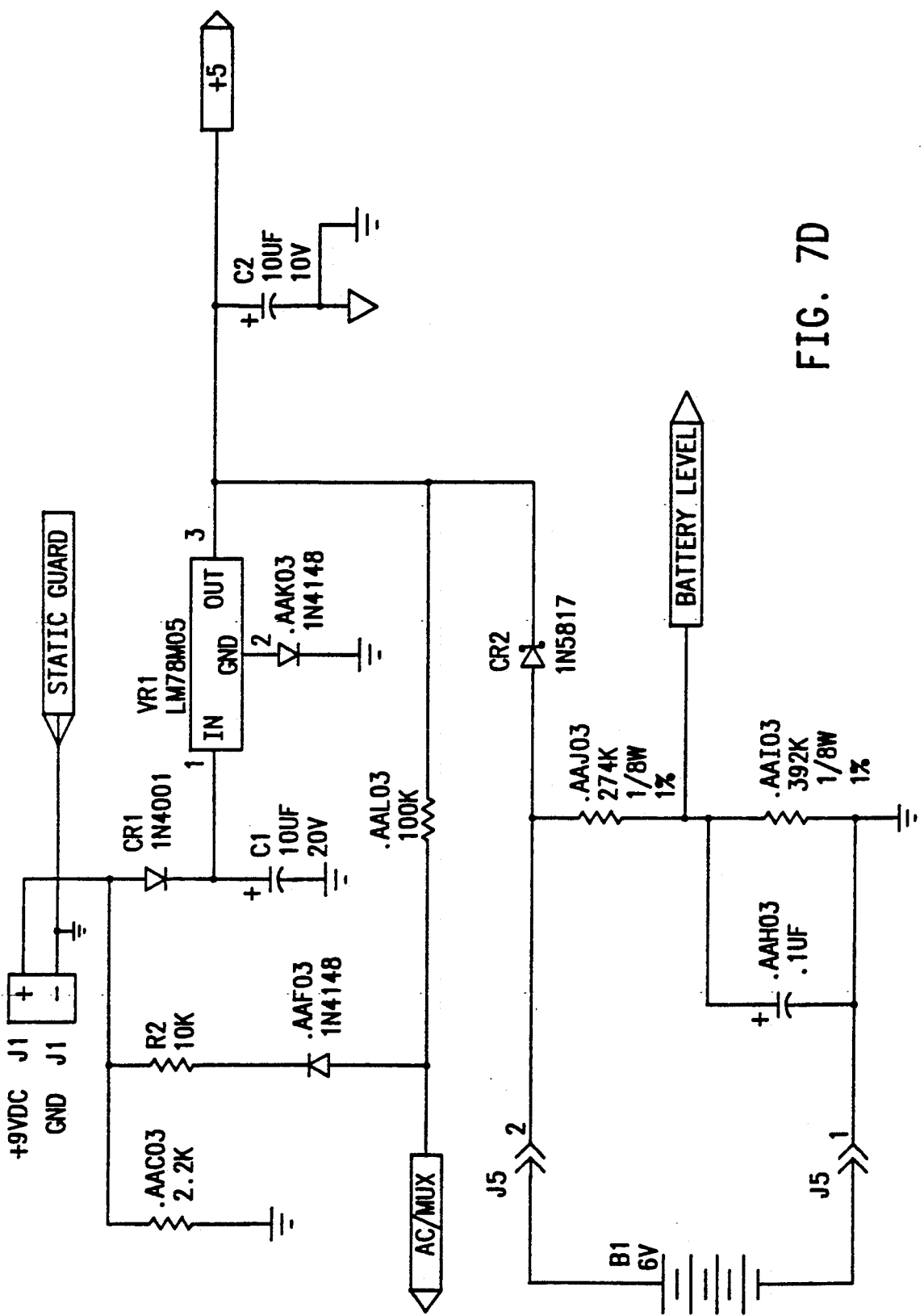
Figure 8A:
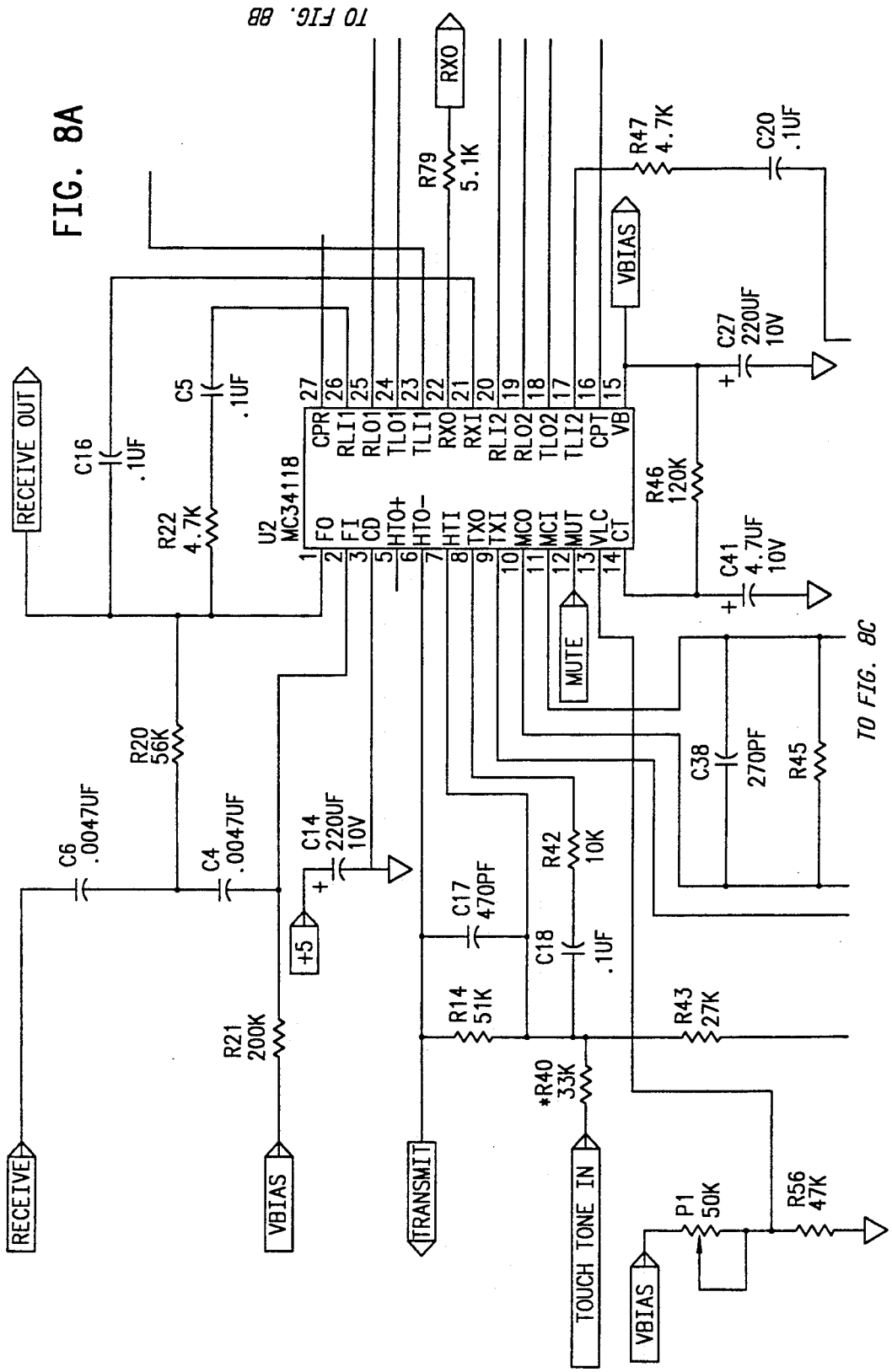
FIG. 8 is a detailed circuit level diagram of the interface circuit portion of the telephone which interfaces with various audio input/output signals.
Figure 8B:
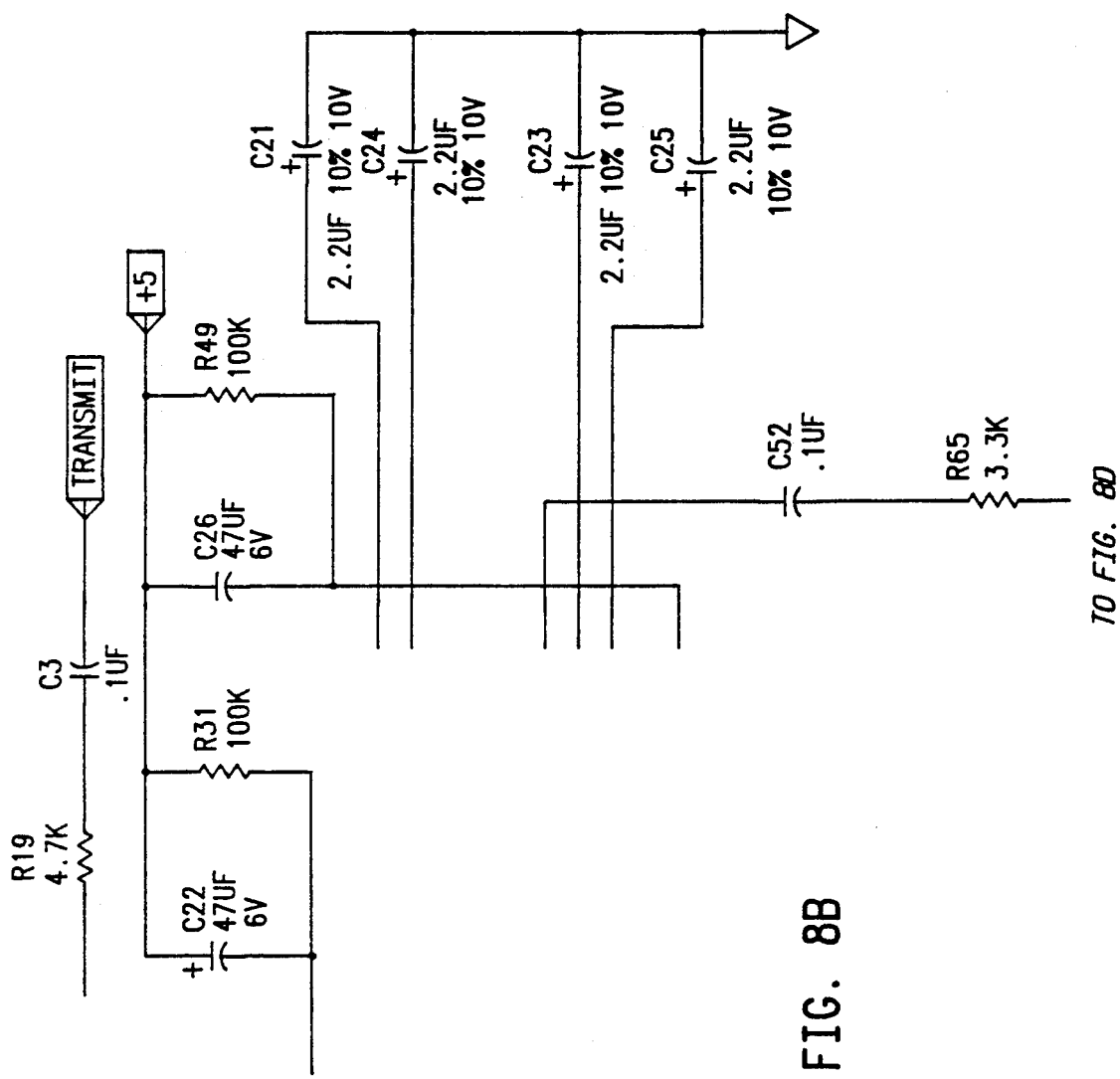
Figure 8C:
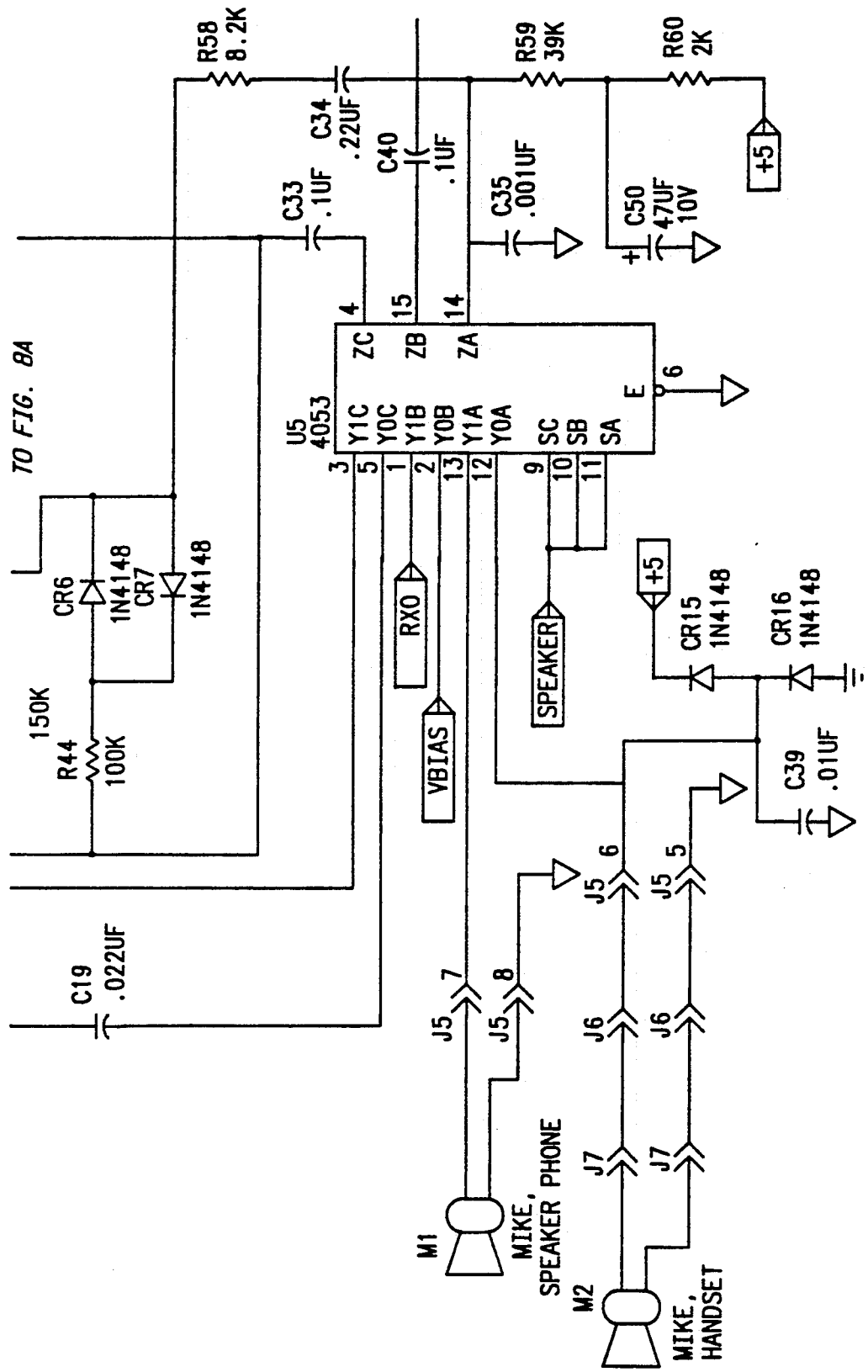
Figure 8D:
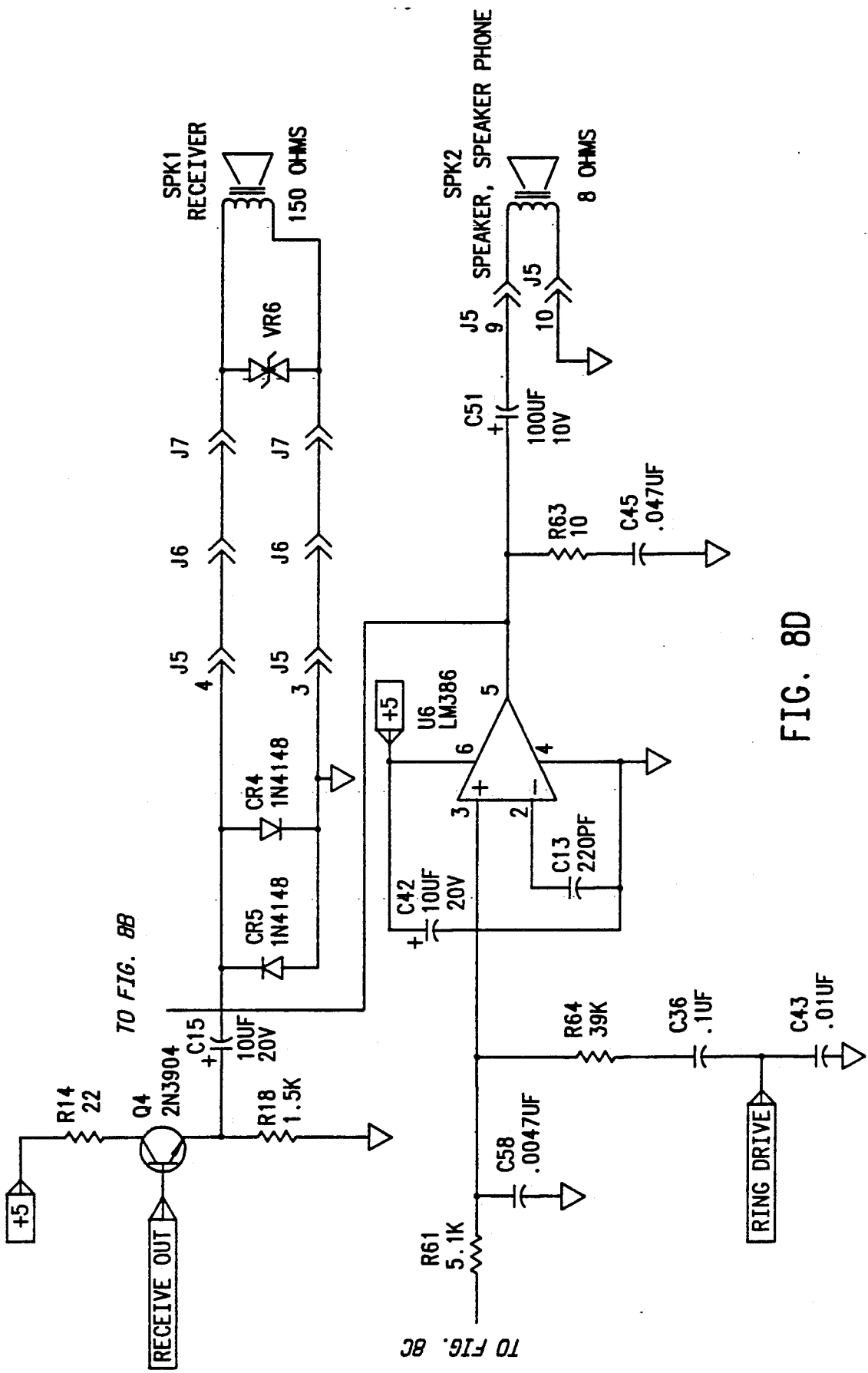

Referring to FIGS. 3 and 4, there is shown in block level diagram the telephone 10. The telephone 10 is connected to a telephone line comprising of a tip and ring 32. The telephone line 32 is connected to a line protection circuit 34 which is then connected to a polarity guard circuit 36. From the polarity guard circuit 36, the signals (to and from) are separated by a hybrid circuit 40 (discussed in greater detail hereinafter), from which the transmit and receive signals are supplied to the audio connect circuit 46 and the receive attenuator circuit 44, respectively. Other analog circuits which connect the handset receiver 50 and handset microphone 52 and the speaker phone microphone 54 are also shown in FIG. 4 and are well known in the art.

The signals in the phone circuit shown in FIG. 4 are supplied to and from a microcomputer 60 shown in FIG. 3. The microcomputer 60 is a 50943 microcomputer made by Mitsubishi. The microcomputer 60 is based on the 6502 processor. The microcomputer 60 contains internal memory in the form of RAM and ROM. In addition, it has timers. The microcomputer 60 also provides bidirectional digital I/O ports. Further, the microcomputer 60 has a built in A/D converter with multiple multiplexed inputs. Finally, the microcomputer 60 has a pulse width modulator capable of generating analog signals when the proper low pass filter is added.

The timing of the microcomputer 60 is controlled by a crystal oscillator circuit 62. The crystal oscillator circuit 62 consists of an 8 MHz quartz crystal and the support components. This is actually driven to oscillation by the microcomputer 60 which divides the resulting signal to get $2\phi OUT$ and $\phi OUT$. The signal $2\phi OUT$ is a 4 MHz digital clock signal that is used to drive the time control circuits 64. The $\phi OUT$ signal, which is a 2 MHz digital clock signal, is used by the microcomputer 60 to set the basic processor cycle time. It is also supplied to a memory control circuit 66 which is used by the memory control circuit 66 to control access to external memory. External memory in the form of $32K \times 8$ SRAM 68, $32K \times 8$ EPROM memory 70, and output latch 72 are all accessed by a 16 bit address bus from the microcomputer 60 with an 8 bit data bus. They are all under the control of the memory control circuit 66.

The memory circuit SRAM 68 is accessed whenever address 0000 through 7FFF are read from or written to. EPROM memory 70 is accessed whenever address 8000 through FFFF are read from. The digital output latch 72 is accessed whenever address 8000 through FFFF are written to. A system reset will initialize the digital output latch 72 causing all outputs to be set to a low logic level.

There are a number of output signals from the output latch 72. The output latch 72 is driven by the microcomputer 60 and can store the results from microcomputer 60. The output latch 72 drives the following signals:

1. DTMF enable 74. This signal is supplied to the DTMF decoder 76. A logic level high on this line enables data output on the DTMF decoder circuit 76.

2. LCD enable 78. The LCD enable signal 78 is supplied to the LCD module 30. A logic level high on the LCD enable 78 enables the LCD controller in the LCD module 30 to read and to write to the LCD display 30.

3. SYNTH 82. This signal is supplied to the synthesis control circuit 84. A logic level high will enable the output of the microcomputer 60 pulse with modulator to be sent to a low pass filter 86 for synthesis of analog audio signals.

4. RING signal 88. A logic level high on this line switches the output of the PWM driven low pass filter 86 to the ring drive path, permitting an audio signal to be supplied to the amplifier 90 of the speaker phone and to the speaker 92 of the speaker phone. This signal is used to synthesize the call ringer. A low logic level on the RING line 88 routes the output of the low pass filter 86 to the speaker phone IC 48. From the speaker phone IC 48, the synthesized audio signal is sent through the audio connect circuit 46 to the tip and ring line to the telephone network to another phone and is used with the call answering feature.

5. LINE signal 94. This signal is supplied to the Hook switch 42 and controls the line status of the telephone 10. A logic level high takes the phone off hook. A logic level low makes the phone on-hook.

6. SPEAKER signal 96. This signal controls whether the phone is in normal, or speaker phone mode. A logic level high turns the speaker phone on. A logic low returns the operation to handset.

7. MUTE signal 98. A logic level high on this line causes attenuation of the receive signal coming from the telephone network of tip and ring 32. It also is used by the speaker phone IC 48 to attenuate the microphone amplifier 90. A logic level low allows normal signal levels. A secondary function of the mute signal 98 is to control the selection of source signals for analog to digital conversion. When mute signal 98 is at a high logic level, signals coming from the telephone network 32 are sent to the recognition source selector 102 circuit which is then supplied through a low pass filter 104, through a sample and hold circuit 106 and to the analog to converter circuit within the microcomputer 60. When mute signal 98 is a logic low, signals from the microphone (handset 52 or speaker 54) are sent to the analog/digital converter in the microcomputer 60.

8. AUDIO signal 100. This signal controls the connection of the Audio connect circuit 46 to the tip and ring 32. A logic level low allows normal operation. A logic level high prevents audio signals from being transmitted or received from the telephone network 32. This is to implement the hold feature and also is used during the speech recognition process.

The microcomputer is also connected to the time control circuit 64. The time control circuit has three functions: system reset, watchdog timer reset, and time reference interrupt. During power up, a reset pulse is generated. This is stretched to allow the microcomputer 60 to become stable. Manual reset is also stretched. The 4 MHz signal, $2\phi OUT$, is divided down to a 61 Hz. (16.384 msec. period signal.) The resulting signal is used to drive the int1 interrupt input on the microcomputer 60. This is used to keep track of real time. Once each cycle of the 61 Hz signal is counted, the watchdog signal 110 must be pulsed to a logic level low and then brought back high. This keeps the watchdog timer from causing an automatic reset of the microcomputer 60. If the watchdog circuit is left at a low logic level, the watchdog timer is disabled.

The microcomputer 60 also directly outputs or reads the following signals:

1. Watchdog signal 110. As previously discussed, the watchdog signal 110 is supplied to the time control circuit 64. A logic level high signifies normal operation. Pulsing the signal from high to low then back to high again is required once every 61 Hz interrupt to prevent a watchdog timer reset. Holding the watchdog signal 110 low disables the watchdog timer. The watchdog timer is used to insure that the microcomputer 60 is operations.

2. Battery signal 112. This is a bidirectional digital signal. This signal is normally used as an input to sense power supply status. A logic level low that is read on this line by the microcomputer 60 indicates that power is being supplied to the telephone 10 by an AC transformer. A logic level high read on this line indicates that batteries are powering the telephone 10. When the microcomputer 60 drives this line high, the batteries are forced to supply power to the telephone 10. This is done to allow testing of battery capacity.

3. Sense hook switch signal 116. This is a digital input signal to the microcomputer 60. This signal is used to detect the status of hook switch 42. A logic level high indicates that the telephone 10 is on hook. A logic level low indicates that the telephone 10 is off hook.

4. Serial in and serial out signals 118A and 118B. These digital signals form an asynchronous serial communication port. This is used during the testing of the telephone 10.

5. S/*H signal 120. This signal is supplied from the microcomputer 60 through the synthesis control circuit 84. This signal is used to drive the sample and hold switch circuit 106 which is used to supply input signal to the A/D converter portion of the microcomputer 60. A logic level high allows sampling of the signal from the sample and hold circuit 106. A logic level low prevents the receipt of signals from the sample hold circuit 106 into the microcomputer 60. When the signal is gated by a logic level high signal on SYNTH signal 82, it is also used to drive the low pass filter 86 that generates audio signals. 6. Slow bus (SB0-SB5) 122. This is a bidirectional bus for digital signals. It is a medium speed data and control bus for operating the keyboard 22 and the option buttons 28 (A-C) of the LCD module 30, and the DTMF decoder 76. SB2 through SB5 are data lines when communicating with the DTMF decoder 76 and the switches 28 (A-C) of the LCD module 30. SB0 and SB1 are control lines when communicating with the switches 28 (A-C) of the LCD module 30. SB0 through SB5 are used as digital outputs to drive the keyboard 22.

7. ROWBUS (ROW0-ROW3) 124. These digital input signals are supplied from the keyboard 22 and are used to decode the keyboard key closures 22.

8. INT 126. This is a digital input signal received from the time control circuit 64. It is a 61 Hz interrupt signal that the microcomputer 60 uses to keep track of real time.

9. INT interrupt signal 128. This is a signal supplied from the DTMF decoder circuit 76 that indicates the presence of a valid DTMF tone.

10. Battery level signal 114. This is an analog input signal from the power supply 130. It is used to determine battery charge level.

11. Line status signal 132. This is an analog signal that is received by the microcomputer 60. It is used to detect incoming ring signals from the telephone network 32. It is generated by the line status monitor circuit 38. In addition, when the telephone 10 is on hold, this line is monitored to detect another telephone on the same line going off hook. If this occurs, the hold state will be ended.

12. Voice Signal 134. This analog input signal is supplied from the sample and hold circuit 106 to the microcomputer 60. Signals from the low pass filter 104 and the sample and hold signal 106 enter the A-D converter portion in the microcomputer 60. They are used for the speech recognition process and for software DTMF detection.

Referring to FIGS. 5-8, there is shown in greater detail some of the blocks shown in FIGS. 3 and 4.

One particular aspect of the telephone 10 is shown in FIG. 7. The hybrid circuit 40 which is used to interface the network telephone lines tip and ring 32 from the transmit and receive lines within the telephone, is shown as a single transistor 40. The single transistor is of bipolar and shown as a PNP transistor Q5 MPSW63. The PNP transistor has a collector 41, a base 39 and an emitter 37.

In the operation of the transistor 40, transmit audio, coming from the CMOS switch (4053) 46, passes through the RC network C9, R10 to the base 39 of the transistor 40. The audio signal into the base 39 modulates the collector current of transistor 40. This collector current is the telephone loop current and is the transmit audio signal out to the telephone line 32. The audio signal from the output of the CMOS switch 46 also passes through another RC circuit, C8 and R24, to the receive attenuator switch 44. The transmit audio signal at the collector of transistor 40 is of equal amplitude but is one hundred eighty (180) degrees out of phase with the signal from 46. A third RC network, C11 and R11, passes this signal, summing it with the signal from the output of 46 causing a cancellation of the transmit audio into the receive attenuator 44. There is no cancellation of receive audio coming from the telephone line 32 which passes from the collector 41 of transistor 40 through this same RC network to the receive attenuator 44.

The integrated circuit designated U1 4053 is a three pole double throw CMOS switch (44 & 46). It is used to connect the receive audio path (C section), and the transmit audio path (B section), to the speaker phone IC. The A section is a receive attenuator switch. It is used to mute the level of the DTMF signals and pulse clicks during dialing.

The line status monitor circuit 38 is a differential amplifier with a very high input impedance (greater than 10 megohms). The inputs are connected to the voltage out of the Polarity Guard 36. When the Hook Switch 42 is open and the telephone 10 is connected to the telephone line 32, the voltage is about 48 volts. The op amp 38 (U3D) converts this voltage to a signal in the range of three volts and passes this to the line status input to the microcomputer 60. When a ring signal is present on the telephone line 32, the output of the Polarity Guard 36 is greater than 100 volts. The output of the op amp 38 is saturated high (greater than 4 volts). When the phone 10 is off hook, the voltage at the output of 36 drops to a much lower value, in the region of 10 to 15 volts, which translates to a voltage less than 1 volt into the line status input. These voltages are interpreted by software in the microcomputer 60 to determine line status. The voltage change which takes place when another phone comes across the telephone line 32 is used by the software to terminate the hold function and drop the line when the second phone picks up the line.

OPERATION

As previously discussed, the software to control the operation of the telephone 10 is stored in the ROM portion of the microcomputer 60 as well as the EPROM memory 70. The software that is stored in the ROM section of the microcomputer 60 is listed on Exhibit A in the microfiche appendix. This software performs the functions of (1) CACF signal processing; (2) Low level hardware support routines; (3) LCD display text messages; and (4) Copyright and code protection code.

The software set forth in Exhibit B is stored in the EPROM memory 70 (except for that portion which is duplicative from Exhibit A), and performs the function of speech recognition.

The software set forth in Exhibit C is stored in the EPROM memory 70 (except for that portion which is duplicative from Exhibit A), and performs the function of user interface.

The RAM memory 68 is used as a scratch pad and for storage of voice templates during the operation of the telephone 10.

In the operation of the telephone 10, the user can use the keypad 22 in its normal prior art operation for dialing a particular user's numbers. The numbers are displayed on the display 30. In addition, the redial key 20, hold key 18, flash key 16, and the speaker key 14 function in the normal prior art manner.

As previously stated, one of the novel aspects of the telephone 10 is its ability to dial a telephone number based upon a speech command. As used herein, a telephone number shall mean a plurality of digits. In this connection, the operation of the telephone 10 would proceed as follows.

Once power has been supplied to the telephone 10, through either an electrical transformer or through batteries, the date and time would be displayed on the display screen 30. The date and time can be changed by pressing the option button C 28 (C) twice and following the prompt on the display device 30 to change the date and time.

TRAINING MODE

Since the telephone 10 responds to a particular speech command, the telephone 10 must be first trained to store the speech pattern of the particular speech to which it will respond. In that connection, the user must first train the telephone 10. The training mode is entered by the user lifting the handset and activating the voice key 26. A message prompting the user to speak is displayed on the display 30. The user then speaks a word or a command. That speech, converted into an analog signal by the handset mike 52, is received by the telephone 10 through the recognition source selector 102, through the low pass filter 104, the sample and hold circuit 106 into the microcomputer 60. The microcomputer 60 performs a number of functions based upon the software that is set forth in Exhibit B.

First, the analog speech or command is supplied at the sample rate of 7200 HZ., and is digitized to yield X(t). A difference between each sample is taken. Thus, the signal after the first difference would be $$S(t) = X(t) - X(t-1)$$

The resultant signal, S(t), from the first difference is to eliminate DC signal. In addition, the difference operation places a 6 db octave preemphasis in the speech and thus acts like a high pass filter. Although a first difference technique has been used in speaker recognition analysis (see "Telephone-Line Speaker Recognition Using Clipped Autocorrelation Analysis", by H. Ney, *Proc. ICASSP*81 (Atlantic, 1981) p. 188-192)), such an analysis has not been done in speech recognition heretofore.

Once the first difference in the sample rate signal is determined, the sampled signals S(t) are supplied to a frame buffer comprising of 144 storage locations. Thus, 144 samples form one frame. Therefore, the frame rate is at 20 msec. A well known processing technique of clipped autocorrelation function is performed on each frame. The clipped autocorrelation function performs the operation as follows:

$$A(m) = \sum_{m=0}^{6} S(t)|S(t-m)|$$

Thereafter, the coefficients, A(m), from each clipped autocorrelation function is normalized to form $A_N(m)$ in accordance with the following formula $$A_N(m) = \frac{A(m)}{A(o)}$$

which is also well known in the art. Each of the coefficients $A_N(m)$ represents a value of a portion of the speech pattern in time.

A standard end point determination technique to determine the beginning and the ending of the speech is also applied.

The software set forth in Exhibit B then checks each frame by frame to compress the signal therein—also based upon the well known prior art technique.

During the training mode, the user is prompted to speak at least twice, or until two words are spoken which are consistent with each other. An average is taken of the two words that the user spoke. This average is based upon a standard, well known technique.

From the foregoing, the normalized coefficients $A_N(m)$, associated with each frame that is calculated, based upon the clipped autocorrelation function, is then stored as the speech pattern of the inputted speech. The user is then prompted to enter the telephone number associated with the speech inputted name. The user then enters the telephone number associated with the inputted speech. At the end of the telephone number, the user presses the option button 28(C) which is associated with the text display of "done".

Thereafter, the telephone 10 prompts the user to enter the alphabetical text name that corresponds to the speech name that was audibly inputted into the telephone 10. The user simply presses the appropriate numeric key which contains the alphabetical letter. However, since there are three possible alphabetical letters that are associated with the activation of one particular numeric key 22, the three choices are then displayed on the display 30. Each choice is displayed juxtaposition to each one of the three option buttons 28 (A–C). The option buttons 28 (A–C) are then reprogrammed such that the activation of one of the keys would then input the particular associated displayed alphabetical letter on the display 30. In this manner, alphabetical text can be entered on the numeric keypad 22 in conjunction with the option buttons 28 (A–C). For example, if the number "5" on the numeric keypad 22 is pressed and the control key 28A is pressed, the letter J would be entered into the telephone 10 and would also be displayed on the display 30.

After the user has entered the alphabetic name that is associated with the speech name that was audibly inputted and the telephone number that was inputted by keypad 22, the option button 28 (C) associated with the text display of "done" is activated again. In one embodiment, the telephone 10 can store up to 50 speech names, each associated with a telephone number, and an alphabetical text name. Clearly, through the addition of greater memories, more names can be stored in the telephone 10.

As previously stated, the option buttons 28 (A–C) can be reprogrammed by the telephone 10 to function for other purposes. The software to perform that function is contained in the listing set forth in Exhibit C. Thus, in the embodiment describe heretofore, the option buttons 28 (A–C) can be changed from changing the date and time function to change inputting alphabetical text function.

DIALING MODE

As previously stated, when the user desires to use the telephone 10 to dial a series of numbers, the user can simply pick up the handset 12 or activate the speaker phone 14 and press the appropriate keys on the keypad 22. Thus, the telephone 10 can dial numbers in a conventional manner. In addition, however, since the function of the telephone 10 is governed by the software contained in the microcomputer 60, the telephone 10 can be placed in a mode whereby the keypad 22 is locked thereby preventing all outgoing calls. However, each of the three option buttons 28 (A–C) would still be functional and they can be reprogrammed to be used for dialing the emergency numbers such as police, fire and ambulance. Further, the telephone 10 can be placed in a protected mode whereby the speech names and each name's associated telephone number and alphabetical text are protected from searches (further discussed) or deletions through reinputting.

The telephone 10 can also respond to speech command dialing. In this aspect, the user picks up the handset 12 and simply speaks a name that the user wants to call—with the speech having been previously trained and stored in the telephone 10. The speech is converted into an analog signal and is received again by the microcomputer 60 through the sample and hold circuit 106.

The microcomputer 60 once again performs the function of finding the first difference of the samples which are sampled at the rate of 7200 HZ. A frame of every 144 samples is also gathered together. A clipped autocorrelation function of each frame is calculated and normalized. The coefficients generated by the clipped autocorrelation function for the inputted speech is then generated.

The plurality of coefficients of the inputted speech pattern is then compared to the plurality of coefficients associated with a stored speech pattern. The comparison is based upon a modified dynamic time warping (DTW) algorithm.

As in the prior art, speech can be expressed as a time sequence of CACF feature vectors:

$$A = a_1, a_2, \ldots a_i, \ldots a_I \text{ test pattern}$$
$$B = b_1, b_2, \ldots b_i, \ldots b_J \text{ reference pattern}$$

Figure 9:
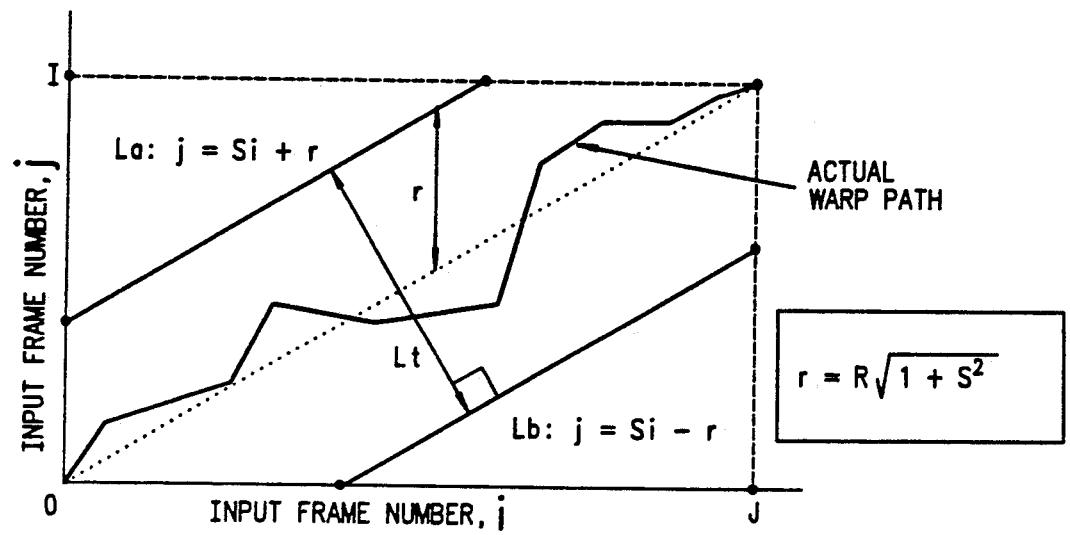
FIG. 9 is a graph showing dynamic time warping algorithm with a constant width band.

The problem of attempting to eliminate timing difference between the two patterns is usually accomplished with a DTW algorithm. FIG. 9 shows a typical band Dynamic Programming graph (see "Dynamic Programming Algorithm Optimization for Spoken Word Recognition" by Hiroaki Sakoe and Seibi Chiba, *IEEE Trans. Acoust., Speech, and Signal Process*, Vol. Assp-26, pp. 43–49, February, 1978).

In the Sakoe & Chiba reference, the band region is defined as:

$$|i-j| \leq r$$

where r is a constant representing the vertical window width where the legal warp path must lie. However, if the length of test & reference (I & J) are very different, the DTW is subject to error.

In a modification to the foregoing DTW algorithm, Paliwa, Agarwal & Sinha (See "A Modification Over Sakoe and Chiba's Dynamic Time Warping Algorithm for Isolated Word Recognition", by K. Paliwa, A. Agarwal and S. S. Sinha), suggested defining the band region as:

$$|i-j/S| \leq r$$

where S is the slope of the line joining (0,0) and (I,J) and is equal to J/I. This definition is still subject to error in that the true window width is actually the length of the band perpendicular line, $L_t$, which varies with S.

In the telephone 10, this variation is eliminated by replacing the constant r with the expression:

$$r = R(\sqrt{1 + S^2})$$

where R is a constant equal to half the length of the perpendicular band line $L_t$. Thus, the new band line is defined as:

$$|i - j/S| \leq L_T/2(\sqrt{1 + S^2}), \text{ where } S = J/I \; (I \neq 0)$$

In the operation of the DTW algorithm, the processed spoken word, i.e., the coefficients of the clipped autocorrelation of the spoken word is compared to each one of the stored words using the DTW algorithm and the word whose coefficients produce the smallest DTW result is the closest word to which the input word correspond. Of course, some provision must be made such that even if the closest match is not one of the possible words, then it must be rejected. Thus, if the closest match, i.e., the result of the DTW operation is still greater than some threshold level, then no match is found.

In the prior art, the matching of the speech pattern of the spoken word to the speech pattern of the stored words must be made through the list of the speech patterns of all the stored words before the correct match is found. It is also known in the prior art to "prune" the operation. In a pruning operation of the prior art, if a search of k words results in an ith word having the lowest value of X, then in the DTW operation on the subsequent words, if during the summation operation the difference of the coefficients at any particular point in time exceeds the value of X, then the operation is terminated—without the need for completing the summation for the rest of the coefficients. This is because if by a particular point in time the value already exceeds the best value obtained theretofore, the operation of DTW on subsequent coefficients can only be worse. (See "Performance Trade-Offs and Search Techniques for Isolated Word Search Recognition", by R. Bisiani, A. Waibel).

Figure 10:
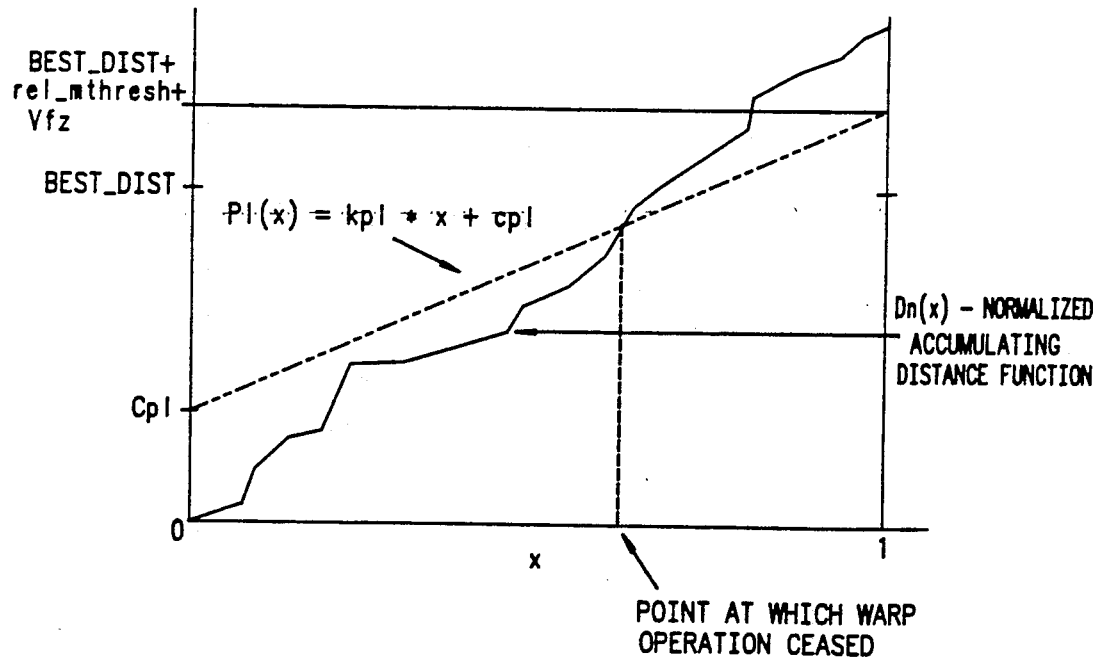
FIG. 10 is a graph showing adaptive linear pruning.

In the telephone 10, to further increase the performance and speed, an adaptive linear pruning method is employed in the searching or matching process. In the adaptive linear pruning method, the DTW operation is first operated on the first word. The DTW operation computes not only the result of the operation but also every subpart summation that corresponds to the particular point in time (see FIG. 10). (Thus, $C_1-C_N$ are computed). Thus, if the line 200 represents the best result of a DTW operation on a word, then not only is the DTW value for the total ($C_N$) computed, but also the linear progressive coefficients ($C_1 \ldots C_{n-1}$) are also computed.

A second word comparison would be made at each point in time between the coefficient as a result of the DTW operation of the spoken word to the second word and to the corresponding coefficients for the best word. Thus, if line 210 represents the operation of the DTW algorithm on the spoken word compared to the second word, then the operation is terminated without waiting for the completion of the DTW operation on the entire coefficients that correspond to the second word. In short, it is assumed that the predictive nature of the progression of the summation of the differences in line 210 will get worse and that the operation need not be permitted to its completion. This, of course, saves computational time and speeds the searching result.

In order to further ensure that the DTW adaptive linear pruning method does not inadvertently prune or weed out the comparison with the potential best score, an offset "0" can be added to the best score. Thus, the DTW operation on other words in subsequent operations, as each coefficient in time is presented, must exceed the best score plus the offset to ensure that the prediction of the calculation of DTW through completion would in all likelihood exceed the DTW of the best score.

Mathematically, this is expressed as follows:
Definitions:
1. abs_mthresh: This is absolute match threshold that a match must be under to be considered as a valid match.
2. rel_mthresh: This is the relative match threshold over which the best match must be greater than the second best match to not be considered "questionable."
3. $f_b$: This is the prune line initial constant divisor ($=\frac{1}{3}$ in the preferred embodiment).
4. $V_{fz}$: This is the prune line variability region constant (=750 in the preferred embodiment).
5. BEST_DIST: This is a variable which is equal to the best total distance scored so far. Initially, BEST_DIST=abs_mthresh. At the end of each computed match, If DISTANCE<BEST_DIST, then: BEST_DIST=DISTANCE The prune line is defined as follows:

$$kpl = (BEST\_DIST + V_{fz} + rel\_mthresh)*(1-f_b)$$

$$cpl = (BEST\_DIST + V_{fz} + rel\_mthresh)*(f_b)$$

$$PL(x) = kpl*x + cpl \text{ where } 0 \leq x \leq 1$$

A match is considered "pruned" when $D_n(x) > PL(x)$, where $D_n(x)$ is the normalized accumulating distance function of the DTW.

With the linear adaptive pruning method, the prune threshold is set to a maximum absolute cutoff threshold initially. If the results of the DTW operation on the first word is such that it is below the initial maximum threshold, then all of the coefficients of the first word would have been operated upon by the DTW operation. Thereafter, the probability decreases as to whether or not the DTW operation is allowed to operate on all of the coefficients of the subsequent words. To further speed up the processing of the match between the coefficients of the spoken word to the coefficients of the stored word, it would be advantageous to have the list of words stored presented with the probability of the best score being presented first for DTW operation. This would mean that the potential best score would be presented first. If indeed the best score were presented first, then using the linear adaptive pruning method would greatly save computation requirements. One possible method as used by the telephone 10 is to present words which correspond to names and therefore a telephone number which has been dialed most frequently. This raises the probability that the spoken word would most likely match the stored word which corresponds to the most frequently dialed telephone number. Thus, a pre-sort feature of the stored words is accomplished by the telephone 10 before the stored words are presented for the DTW adaptive pruning analysis.

As a result of the foregoing, a general purpose microcomputer 60 can be used in the telephone 10. This saves cost in the telephone 10. Because it is always possible that the telephone 10 is unable to match the speech pattern of the spoken word with the speech pattern of any of the stored words, the stored words that are most probable of being matched, e.g., the stored words that have the lowest values of DTW algorithm operation but still exceed a threshold amount, are presented for display on the display 30. A match j that falls into the "questionable" region must satisfy the following criterion:
A. $Score_j$ < absolute match threshold ('abs_mthresh')
B. $Score_j - Score_{best}$ < relative match threshold ('rel_mthresh')

If the number of matches in the questionable region is >1, then the user is prompted to make a choice.

The telephone 10 presents its best questionable match for the user to confirm whether it is indeed the word that was spoken. The user can then press option button A 28 (A) ("yes") if it is correct, or option button B 28 (B) ("no") to request the telephone 10 to display the next best questionable match. This process continues until either "yes" (28 (A)) is pressed or there is only one remaining questionable match left, wherein it is dialed. Thus, on questionable matches, user input is sought.

SPEED DIALING

Another way for a user to use the telephone 10 is to press the directory key 24. The user is then prompted to enter one of the numbers from the numeric keypad 22. The number that the user selects has three alphabetical letters associated therewith. All the names in that three letter group are presented in alphabetical order. To scroll forward, the user presses that same numeric key repeatedly. When a particular desired name and number are presented on the display 30, the user then activates the redial key 20 to dial that number. The software to accomplish this is set forth in Exhibit C.

DIRECTORY ASSISTANCE

The telephone 10 can also be used to retrieve a telephone number—without dialing. There are two methods to accomplish the foregoing. In one method, the user simply presses the directory key 24 and then presses the voice button 26. The user then speaks the name. The telephone 10 will process the speech signal as previously discussed and display the chosen name and the telephone number associated with that name.

The telephone 10 can also be searched to retrieve a telephone number manually. The user presses the directory key 24 and then a number on the keypad 22. The user does not have to press an option button 28 (A–C) to narrow a three (3) letter group down to one. The names are simply accessed in alphabetical order in that letter group, i.e. '2' = "ABC" = all names starting with A or B or C). Also, to scroll through the letter group, the user presses that same key repeatedly to move forward. The option buttons 28 (A–C) are not used at all except to display the one-button speed dial names/numbers. The software to accomplish this is set forth in Exhibit C.

CALL LOGGING

The telephone apparatus 10 can also log the last one hundred calls made. The telephone 10 also stores the time, the date, and the phone number called and the length of each call. The user can review this log at any time to audit phone bills, scan for frequently called numbers or redial those numbers, or any other purpose. To review this log, the user presses option button B 28 (B). The software to accomplish this is set forth in Exhibit C.

PHONE ANSWERING/CALL SCREENING

The telephone 10 also has an answering facility. It can be activated by pressing option button A 28 (A). When it is activated, in the unattended mode, the telephone 10 will answer all calls with a prerecorded message. The apparatus 10 then prompts the caller to use the caller's telephone to dial in the telephone number of the caller. The caller, however, must be at a telephone apparatus that generates a DTMF signal. The DTMF signals are received by the telephone 10 and are converted into signals that represent the telephone number of the caller. The telephone 10 then records that number and the time of the call.

In addition, the telephone 10 can use the telephone number received from the caller and search through its directory to find the corresponding name. When the user returns, the telephone 10 can display the number of messages it has recorded. In addition, the time and the phone numbers are displayed. Finally, if there is a name associated with the phone numbers, i.e., the phone numbers are in the directory of the telephone apparatus 10, the name will be displayed as well.

Another aspect of phone answering is that the user can program the telephone 10 such that once a call has been answered and the caller has left the message comprising the DTMF signals indicating the telephone number of the caller, the telephone apparatus can then automatically dial a preset number (which is the telephone number of a paging service) and regenerate the DTMF signals left by the caller. Thus, the telephone apparatus 10 can relay the numbers of the caller after a caller has left the message of where the caller can be reached.

Finally, the telephone 10 can be placed in call screening mode. When this is activated by pressing option button A 28 (A), the telephone apparatus 10 does not ring when a incoming call is received. However, if the calling party knows the preassigned code, the calling party can dial in the code. This would override the call screening capability and the ringer would then be turned on. Without the code, the calling party then receives the phone answering message and the telephone 10 records the calling telephone number of the caller.

What is claimed is:

1. A speech activated telephone having means for dialing a pre-stored telephone number, wherein the improvement comprising:
   means for inputting a plurality of acoustic commands into said telephone in a training mode;
   means for processing said plurality of acoustic commands into a plurality of processed signals;
   means for storing said plurality of processed signals;
   means for inputting a telephone number and an alphanumeric name associated with each acoustic command, in said training mode;
   means for storing said telephone number and said alphanumeric name associated with each acoustic command;
   means for receiving a dialing acoustic command in a dialing mode;
   means for processing said dialing acoustic command into a voice signal;
   means for comparing said voice signal to said stored processed signals;
   means for automatically displaying a plurality of alphanumeric names in response to said comparing means being unable to match said voice signal with only one of said stored processed signals;
   user activatable switch means for selecting one of said displayed alphanumeric names; and
   means for generating a dialing signal representative of the telephone number associated with said selected displayed alphanumeric name in response to said user activatable switch means.

2. A telephone comprising:
   means for storing a plurality of names, a telephone number associated with each name, and a speech pattern of each name;
   speech input means for inputting a speech pattern of a name to be searched;
   means for comparing said inputted speech pattern to said stored speech patterns;
   means for automatically retrieving one or more names from said storing means, based upon said comparison in the event said comparing means is unable to match only one of said stored speech patterns to said inputted speech pattern;

means for displaying said one or more names;

means for selecting one of said one or more names displayed; and means for dialing the telephone number associated with the one name selected by the selecting means.

3. The telephone of claim 2 wherein said display means displays said one or more names in an order.

4. The telephone of claim 3 wherein said order is the presentation first of the name having the highest probability of match followed by names having decreasing probability of match.

* * * * *